(12) United States Patent
Tojima

(10) Patent No.: US 12,177,593 B2
(45) Date of Patent: Dec. 24, 2024

(54) PHOTOELECTRIC CONVERSION APPARATUS AND SYSTEM HAVING PHOTODIODES TO PERFORM AVALANCHE MULTIPLICATION

(71) Applicant: CANON KABUSHIKI KAISHA, Tokyo (JP)

(72) Inventor: Kenzo Tojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 94 days.

(21) Appl. No.: 18/302,299

(22) Filed: Apr. 18, 2023

(65) Prior Publication Data

US 2023/0388675 A1  Nov. 30, 2023

(30) Foreign Application Priority Data

Apr. 20, 2022 (JP) ................. 2022-069480

(51) Int. Cl.
| | |
|---|---|
| *H04N 25/773* | (2023.01) |
| *G01S 7/4863* | (2020.01) |
| *G01S 17/894* | (2020.01) |
| *G01S 17/931* | (2020.01) |
| *G06T 7/55* | (2017.01) |
| *H04N 23/56* | (2023.01) |
| *H04N 25/532* | (2023.01) |

(52) U.S. Cl.
CPC ......... *H04N 25/773* (2023.01); *G01S 7/4863* (2013.01); *G01S 17/894* (2020.01); *G01S 17/931* (2020.01); *G06T 7/55* (2017.01); *H04N 23/56* (2023.01); *H04N 25/532* (2023.01); *G06T 2207/30252* (2013.01)

(58) Field of Classification Search
CPC .... H04N 25/773; H04N 23/56; H04N 25/532; H04N 25/705; G01S 17/894
See application file for complete search history.

(56) References Cited

U.S. PATENT DOCUMENTS

| | | | | |
|---|---|---|---|---|
| 11,846,542 | B2* | 12/2023 | Yamazaki | ............ H04N 25/702 |
| 11,937,004 | B2* | 3/2024 | Morimoto | ............ H04N 25/773 |
| 2020/0244909 | A1* | 7/2020 | Morimoto | ............ H04N 25/773 |
| 2021/0389176 | A1* | 12/2021 | Yamazaki | .............. H04N 25/75 |

FOREIGN PATENT DOCUMENTS

JP  2020123847 A  8/2020

\* cited by examiner

*Primary Examiner* — Nicholas G Giles
(74) *Attorney, Agent, or Firm* — Canon U.S.A., Inc., IP Division

(57) ABSTRACT

A photoelectric conversion apparatus includes a first pixel and a second pixel, each of which includes a photodiode, and a signal processing circuit including a control circuit and a counter. The control circuit is connected to the photodiode and a circuit configured to generate a pulse signal, and performs control, based on the pulse signal, so as to be in a standby state or a recharge state. The counter counts the number of periods in which avalanche multiplication has occurred in the standby state. A third pulse of the pulse signal for the second pixel is input to the control circuit in a period from when a first pulse of the pulse signal for the first pixel is input to the control circuit to when a second pulse of the pulse signal for the first pixel subsequent to the first pulse is input to the control circuit.

19 Claims, 19 Drawing Sheets

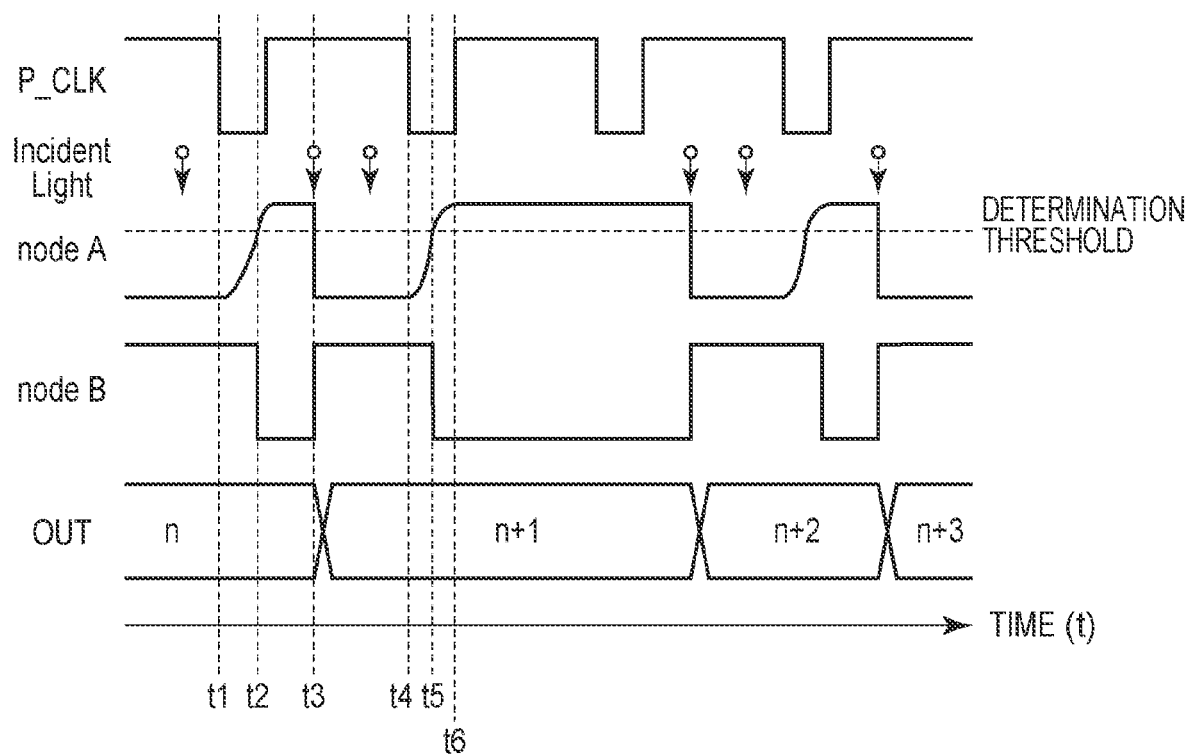

FIG. 6A

| P_CLK_0 (P_CLK_IN_0) |
| --- |
| P_CLK_1 (P_CLK_IN_1) |
| P_CLK_2 (P_CLK_IN_2) |
| P_CLK_3 (P_CLK_IN_3) |
| P_CLK_4 (P_CLK_IN_4) |
| P_CLK_5 (P_CLK_IN_5) |
| P_CLK_6 (P_CLK_IN_6) |
| P_CLK_7 (P_CLK_IN_7) |

FIG. 6B

| P_CLK_0 (P_CLK_IN_0) | P_CLK_1 (P_CLK_IN_1) | P_CLK_2 (P_CLK_IN_2) | P_CLK_3 (P_CLK_IN_3) | P_CLK_4 (P_CLK_IN_4) | P_CLK_5 (P_CLK_IN_5) | P_CLK_6 (P_CLK_IN_6) | P_CLK_7 (P_CLK_IN_7) |
| --- | --- | --- | --- | --- | --- | --- | --- |

FIG. 6C

| P_CLK_0 (P_CLK_IN_0) | P_CLK_1 (P_CLK_IN_1) |
| --- | --- |
| P_CLK_2 (P_CLK_IN_2) | P_CLK_3 (P_CLK_IN_3) |
| P_CLK_4 (P_CLK_IN_4) | P_CLK_5 (P_CLK_IN_5) |
| P_CLK_6 (P_CLK_IN_6) | P_CLK_7 (P_CLK_IN_7) |

FIG. 10A

| P_CLK_0-1 (P_CLK_IN_0-1) |
|---|
| P_CLK_2-3 (P_CLK_IN_2-3) |
| P_CLK_4-5 (P_CLK_IN_4-5) |
| P_CLK_6-7 (P_CLK_IN_6-7) |
| P_CLK_8-9 (P_CLK_IN_8-9) |
| P_CLK_10-11 (P_CLK_IN_10-11) |
| P_CLK_12-13 (P_CLK_IN_12-13) |
| P_CLK_14-15 (P_CLK_IN_14-15) |

FIG. 10B

| P_CLK_0-1 (P_CLK_IN_0-1) | P_CLK_2-3 (P_CLK_IN_2-3) | P_CLK_4-5 (P_CLK_IN_4-5) | P_CLK_6-7 (P_CLK_IN_6-7) | P_CLK_8-9 (P_CLK_IN_8-9) | P_CLK_10-11 (P_CLK_IN_10-11) | P_CLK_12-13 (P_CLK_IN_12-13) | P_CLK_14-15 (P_CLK_IN_14-15) |
|---|---|---|---|---|---|---|---|

FIG. 10C

| P_CLK_0-1 (P_CLK_IN_0-1) | P_CLK_2-3 (P_CLK_IN_2-3) |
|---|---|
| P_CLK_4-5 (P_CLK_IN_4-5) | P_CLK_6-7 (P_CLK_IN_6-7) |
| P_CLK_8-9 (P_CLK_IN_8-9) | P_CLK_10-11 (P_CLK_IN_10-11) |
| P_CLK_12-13 (P_CLK_IN_12-13) | P_CLK_14-15 (P_CLK_IN_14-15) |

FIG. 11A

| P_CLK_0 | P_CLK_0 | P_CLK_0 | P_CLK_0 |
|---|---|---|---|
| P_CLK_1 | P_CLK_1 | P_CLK_1 | P_CLK_1 |
| P_CLK_0 | P_CLK_0 | P_CLK_0 | P_CLK_0 |
| P_CLK_1 | P_CLK_1 | P_CLK_1 | P_CLK_1 |

FIG. 11B

| P_CLK_0 | P_CLK_1 | P_CLK_0 | P_CLK_1 |
|---|---|---|---|
| P_CLK_0 | P_CLK_1 | P_CLK_0 | P_CLK_1 |
| P_CLK_0 | P_CLK_1 | P_CLK_0 | P_CLK_1 |
| P_CLK_0 | P_CLK_1 | P_CLK_0 | P_CLK_1 |

FIG. 11C

| P_CLK_0 | P_CLK_1 | P_CLK_0 | P_CLK_1 |
|---|---|---|---|
| P_CLK_1 | P_CLK_0 | P_CLK_1 | P_CLK_0 |
| P_CLK_0 | P_CLK_1 | P_CLK_0 | P_CLK_1 |
| P_CLK_1 | P_CLK_0 | P_CLK_1 | P_CLK_0 |

START OF COUNTING

START OF COUNTING

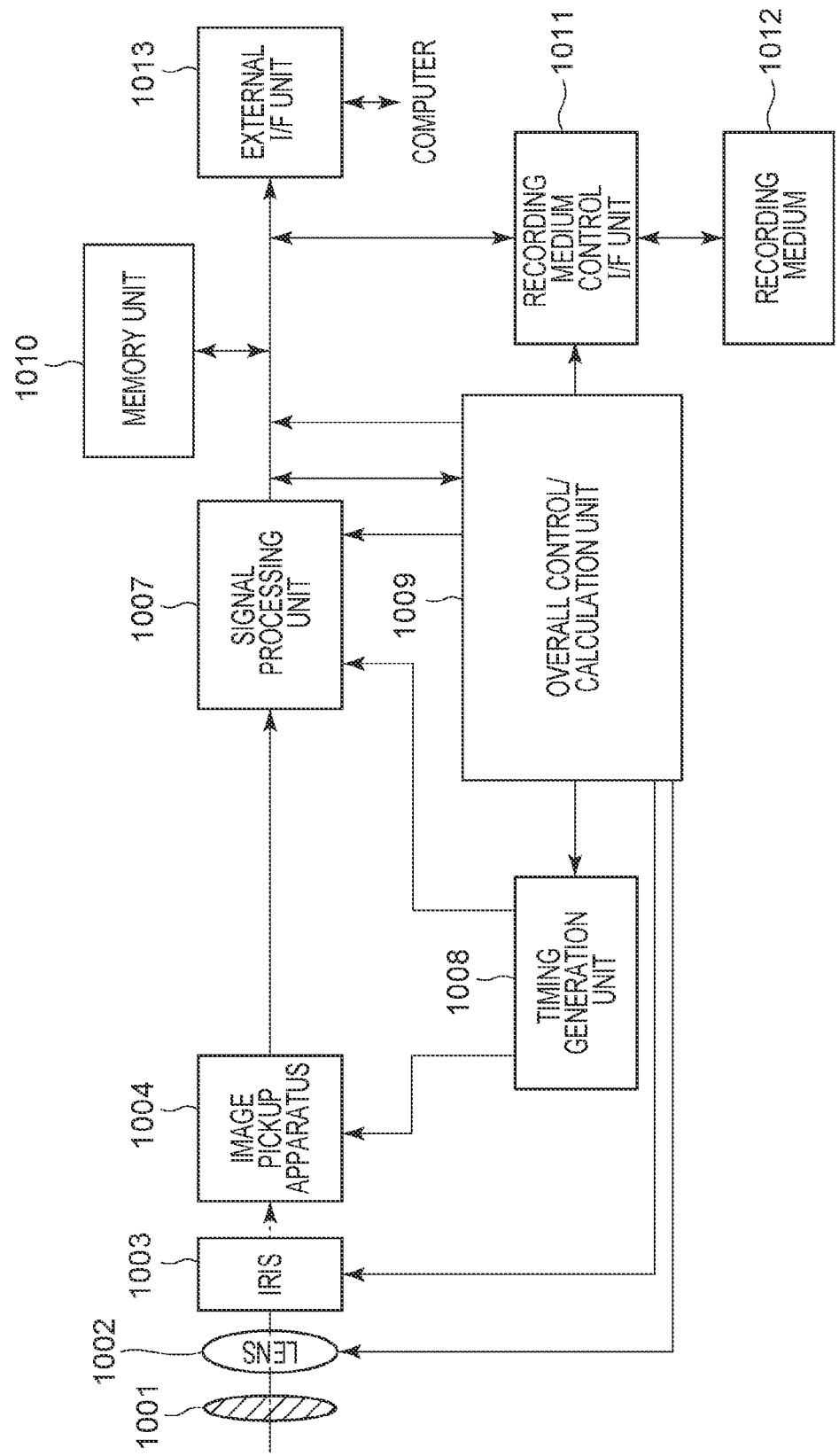

PHOTOELECTRIC CONVERSION APPARATUS AND SYSTEM HAVING PHOTODIODES TO PERFORM AVALANCHE MULTIPLICATION

BACKGROUND

Technical Field

One disclosed aspect of the embodiments relates to a photoelectric conversion apparatus and a photoelectric conversion system.

Description of the Related Art

A photoelectric conversion apparatus including a pixel array is known, the pixel array being formed such that a plurality of pixels including avalanche photodiodes (APDs) are arranged in a two-dimensional array in a planar manner. In each pixel, in a PN junction region inside a semiconductor region, a photocarrier due to a single photon causes avalanche multiplication.

Japanese Patent Laid-Open No. 2020-123847 discloses an APD, a quenching circuit connected to the APD, a signal control circuit to which a signal output from the APD is input, and a pulse generation circuit connected to the quenching circuit and the signal control circuit.

A photoelectric conversion apparatus described in Japanese Patent Laid-Open No. 2020-123847 has a problem in that when all the APDs in a pixel array are simultaneously caused to transition to a standby state, recharge currents flow at the same time, so that the peak value of power consumption is increased.

SUMMARY

A photoelectric conversion apparatus includes a first pixel and a second pixel, each of which includes a photodiode configured to perform avalanche multiplication, and a signal processing circuit configured to generate a signal based on a photon detected by the photodiode. Each signal processing circuit includes a control circuit, and a counter. The control circuit is connected to the photodiode and a generation circuit configured to generate a pulse signal, and performs control, based on the pulse signal, so as to be in a standby state in which one node of the photodiode is floating or a recharge state in which a potential at the node is returned to a certain potential. The counter counts the number of periods in which avalanche multiplication has occurred among a plurality of periods in the standby state. A third pulse of the pulse signal for the second pixel is input to the control circuit of the second pixel in a period from when a first pulse of the pulse signal for the first pixel is input to the control circuit of the first pixel to when a second pulse of the pulse signal for the first pixel subsequent to the first pulse is input to the control circuit of the first pixel.

Further features of the embodiments will become apparent from the following description of exemplary embodiments with reference to the attached drawings.

BRIEF DESCRIPTION OF THE DRAWINGS

FIG. 5 is a diagram illustrating a relationship between an operation and an output signal of an APD of the photoelectric conversion apparatus according to the embodiment.

FIGS. 6A to 6C are diagrams illustrating control positions, within a screen, of control signals of the photoelectric conversion apparatus according to a first embodiment.

FIGS. 10A to 10C are diagrams illustrating control positions, within the screen, of control signals of a photoelectric conversion apparatus according to a second embodiment.

FIGS. 11A to 11C illustrate examples of the way in which control signals of the photoelectric conversion apparatus according to the second embodiment are assigned.

FIG. 15 is a functional block diagram of a photoelectric conversion system according to a fourth embodiment.

DESCRIPTION OF THE EMBODIMENTS

Figure 1:
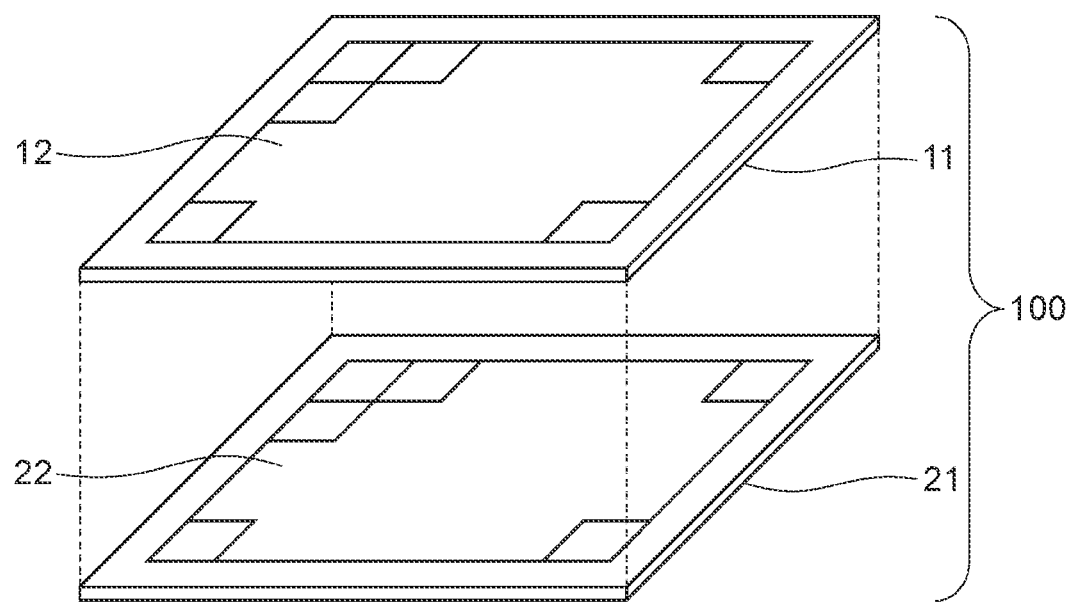
FIG. 1 is a diagram illustrating the configuration of a photoelectric conversion apparatus according to an embodiment.

Embodiments to be described below are concretizations of technical ideas of the disclosure and are not intended to limit the scope of the disclosure. The sizes of and the positional relationship between members illustrated in the individual drawings may be exaggerated for purposes of clear description. In the following description, the identical configurations may be denoted by the same reference numerals, and description thereof may be omitted. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit"

refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

A configuration common to photoelectric conversion apparatuses according to individual embodiments will be described using FIGS. 1 to 5. A photoelectric conversion apparatus has a single-photon avalanche diode (SPAD) pixel including an APD. In a charge pair generated in an avalanche photodiode, the conductivity type of charge to be used as signal charge will be called a first conductivity type. The first conductivity type refers to a conductivity type in which electric charge having the same polarity as signal charge is treated as a majority carrier. The conductivity type opposite to the first conductivity type will be called a second conductivity type. In the following, an example will be described in which signal charge is an electron, the first conductivity type is N-type, and the second conductivity type is P-type; however, the signal charge may be a hole, the first conductivity type may be P-type, and the second conductivity type may be N-type.

In a case where the signal charge is an electron, a signal is read out from the cathode of an APD; however, in a case where the signal charge is a hole, a signal is read out from the anode of the APD. Thus, there is an inverse relationship between the cathode and the anode of the APD.

Herein, "a plan view" refers to viewing from a direction perpendicular to a light incident surface of a semiconductor layer where a photoelectric conversion element to be described below is arranged. Moreover, "cross section" refers to a surface in a direction perpendicular to the light incident surface of the semiconductor layer where the photoelectric conversion element is arranged. Note that in a case where the light incident surface of the semiconductor layer is microscopically rough, a plan view is defined with reference to the light incident surface of the semiconductor layer that is viewed macroscopically.

In the following description, the anode of an APD is set to a fixed electric potential, and a signal is extracted from the cathode side. Thus, a first-conductivity-type semiconductor region where electric charge having the same polarity as signal charge is treated as a majority carrier is an N-type semiconductor region. A second-conductivity-type semiconductor region where electric charge having a different polarity from the signal charge is treated as a majority carrier is a P-type semiconductor region. Note that the disclosure is achieved even in a case where the cathode of the APD is set to a fixed electric potential and where a signal is extracted from the anode side. In this case, the first-conductivity-type semiconductor region where electric charge having the same polarity as signal charge is treated as a majority carrier is a P-type semiconductor region, and the second-conductivity-type semiconductor region where electric charge having a different polarity from the signal charge is treated as a majority carrier is an N-type semiconductor region. In the following, a case will be described where one of the nodes of an APD is set to a fixed electric potential; however, the potentials of both of the nodes may vary.

Herein, in a case where the term "impurity concentration" is simply used, the term refers to a net impurity concentration obtained by subtracting an amount added by impurities of the reverse conductivity type. That is, "impurity concentration" refers to NET doping concentration. A region where P-type doping concentration is higher than N-type doping concentration is a P-type semiconductor region. In contrast, a region where N-type doping concentration is higher than P-type doping concentration is an N-type semiconductor region.

First, a configuration common to the individual embodiments will be described.

FIG. 1 is a diagram illustrating the configuration of a photoelectric conversion apparatus 100 according to an embodiment. In the following, a case where the photoelectric conversion apparatus 100 is a multilayer photoelectric conversion apparatus will be described as an example. That is, a photoelectric conversion apparatus including two substrates which are stacked and are electrically connected to each other will be described as an example. The two substrates are a sensor substrate 11 and a circuit substrate 21. However, the photoelectric conversion apparatus is not limited to this. For example, a photoelectric conversion apparatus may be a photoelectric conversion apparatus in which a configuration included in the sensor substrate 11 and a configuration included in the circuit substrate, which will be described below, are arranged in the same semiconductor layer. In the following, a photoelectric conversion apparatus in which the configuration included in the sensor substrate 11 and the configuration included in the circuit substrate are arranged in the same semiconductor layer may also be referred to as a non-multilayer photoelectric conversion apparatus.

The sensor substrate 11 has a first semiconductor layer and a first wiring structure. The first semiconductor layer has photoelectric conversion elements 102, which will be described later. The circuit substrate 21 has a second semiconductor layer and a second wiring structure. The second semiconductor layer has, for example, signal processing circuits 103, which will be described later. The photoelectric conversion apparatus 100 is constituted by stacking the second semiconductor layer, the second wiring structure, the first wiring structure, and the first semiconductor layer in this order.

FIG. 1 illustrates a back-illuminated photoelectric conversion apparatus in which light enters from a first surface, and a circuit substrate is disposed on a second surface, which is a surface on an opposite side from the first surface. In the case of a non-multilayer photoelectric conversion apparatus, a surface on the side where a transistor of a signal processing circuit is disposed is referred to as a second surface. In the case of a back-illuminated photoelectric conversion apparatus, a first surface on the opposite side of a semiconductor layer from a second surface of the semiconductor layer is a light incident surface. In the case of a front-illuminated photoelectric conversion apparatus, the second surface of the semiconductor layer is a light incident surface.

In the following, the sensor substrate 11 and the circuit substrate 21 will be described as chips obtained by dicing; however, the sensor substrate 11 and the circuit substrate 21 are not limited to such chips. For example, each substrate may be a wafer. The individual substrates may be stacked one on top of the other in a wafer state and then be subjected to dicing. Alternatively, the individual substrates may also be divided into chips, and chips may be stacked one on top of the other and joined to each other.

A pixel region 12 is arranged on the sensor substrate 11, and a circuit region 22, which processes signals detected by the pixel region 12, is arranged on the circuit substrate 21.

Figure 2:
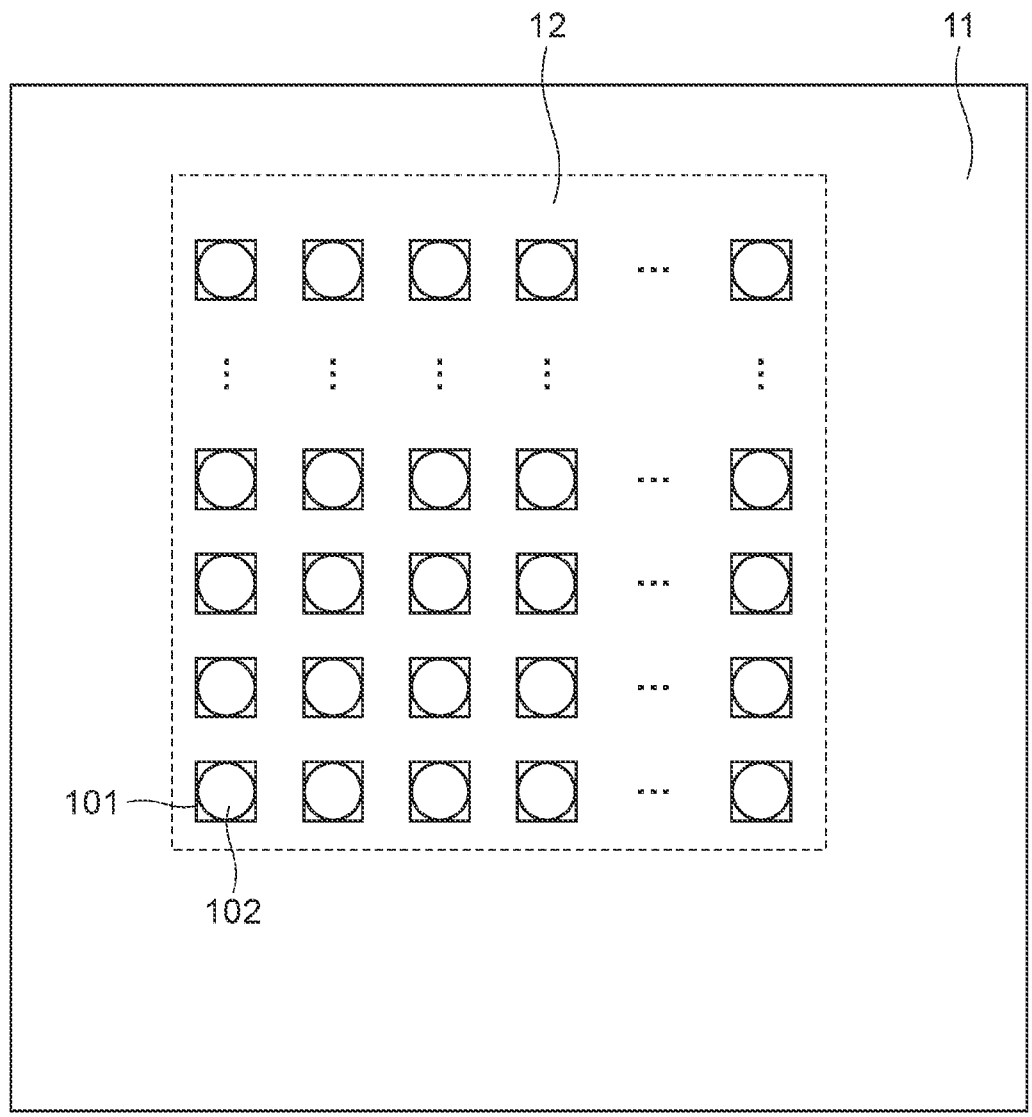
FIG. 2 is a layout example of a sensor substrate of the photoelectric conversion apparatus according to the embodiment.

FIG. 2 is a diagram illustrating a layout example of the sensor substrate 11. The pixel region 12 is formed by arranging, in a two-dimensional array in a plan view, pixels 101 having photoelectric conversion elements 102 including APDs.

Typically, the pixels 101 are pixels for forming an image; however, the pixels 101 do not have to form an image when used for time of flight (TOF). That is, the pixels 101 may also be pixels used to measure the time of arrival of light and the amount of light.

Figure 3:
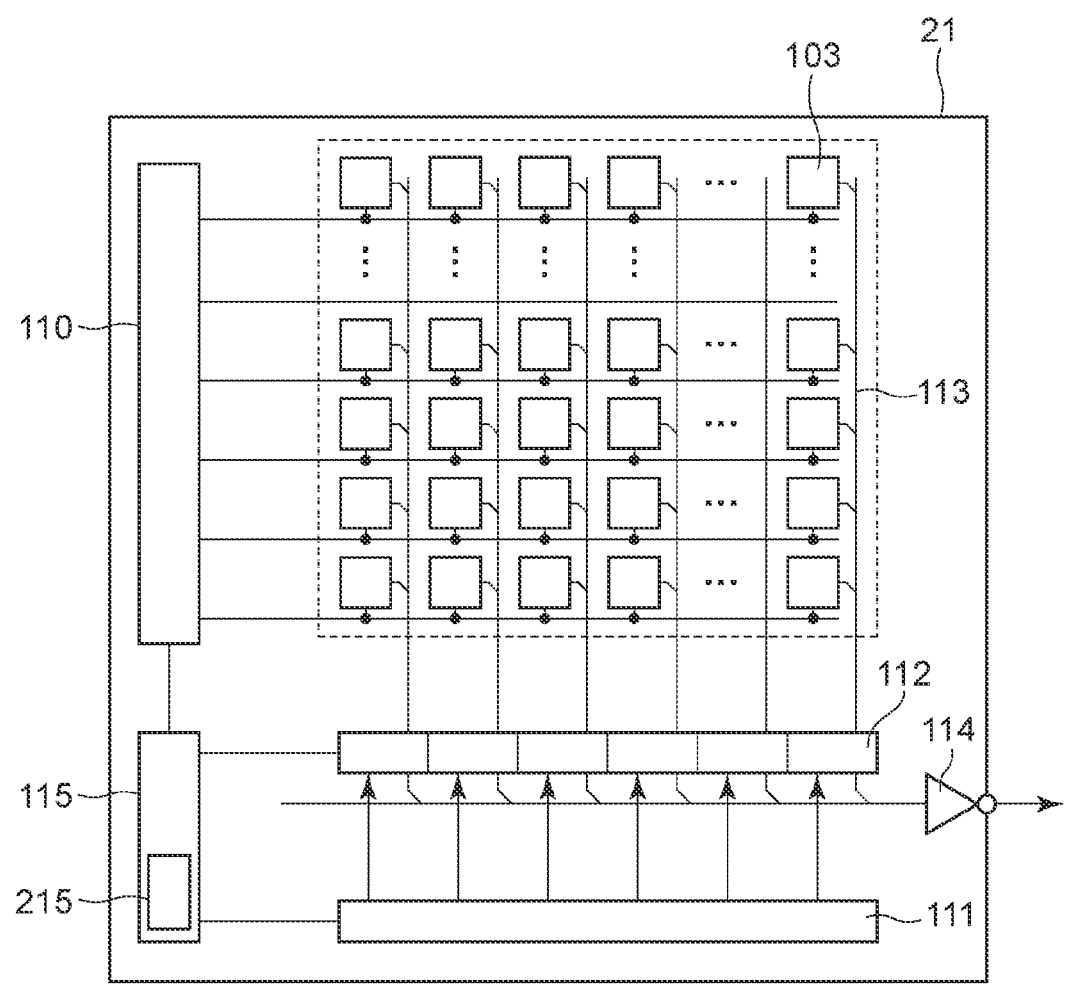
FIG. 3 is a layout example of a circuit substrate of the photoelectric conversion apparatus according to the embodiment.

FIG. 3 is a diagram of the configuration of the circuit substrate 21. The circuit substrate 21 has signal processing circuits 103, a read-out circuit 112, a control pulse generation unit or circuit 115, a horizontal scanning circuit 111, signal lines 113, and a vertical scanning circuit 110. The signal processing circuits 103 process electric charge obtained by photoelectric conversion performed by the photoelectric conversion elements 102 in FIG. 2.

The photoelectric conversion elements 102 in FIG. 2 are electrically connected to the signal processing circuits 103 in FIG. 3 via connection wiring lines provided on a pixel basis.

The vertical scanning circuit 110 receives a control pulse supplied from the control pulse generation unit or circuit 115 and supplies the control pulse to each pixel. In the vertical scanning circuit 110, a logic circuit such as a shift register or an address decoder is used.

Figure 4A:
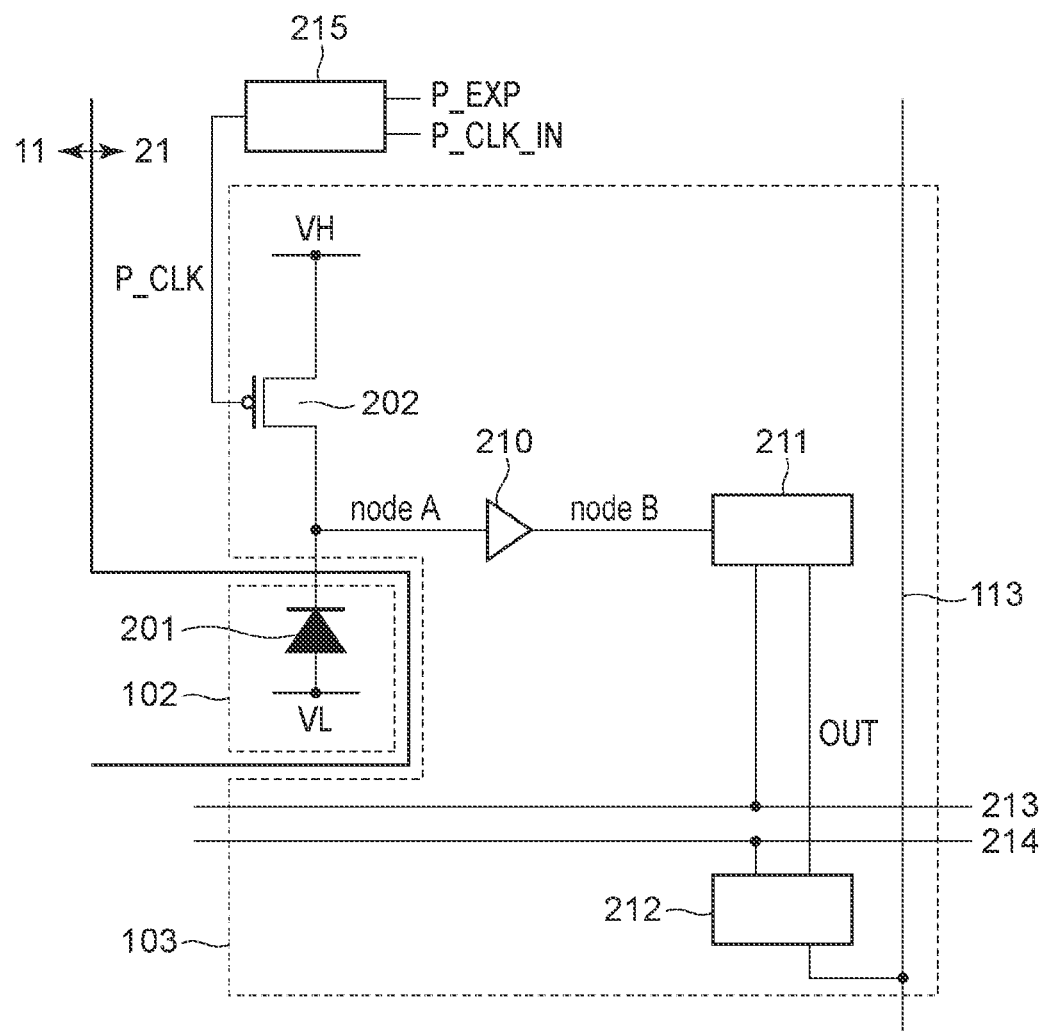
FIGS. 4A and 4B are block diagrams including an equivalent circuit of a photoelectric conversion element of the photoelectric conversion apparatus according to the embodiment.
Figure 4B:
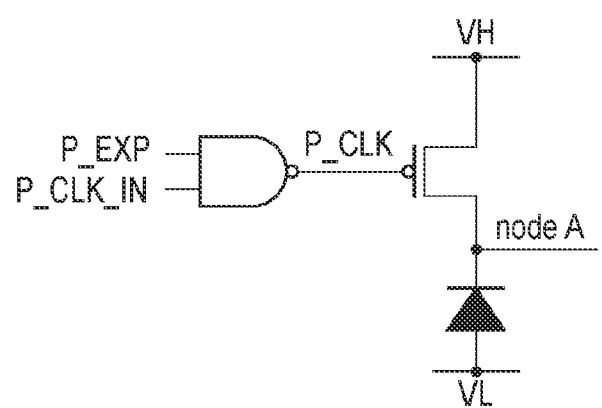

The control pulse generation unit or circuit 115 has a signal generation unit or circuit 215, which generates a control signal P_CLK for a switch to be described later. The signal generation unit or circuit 215 generates a pulse signal for controlling the switch as described below. Note that, for example, as illustrated in FIG. 4A, the signal generation unit or circuit 215 may generate a single control signal P_CLK for a plurality of pixels in the pixel region. Alternatively, as illustrated in FIG. 4B, the signal generation unit or circuit 215 may generate a control signal P_CLK on a pixel basis. In a case where a common pulse signal P_CLK is generated, the common pulse signal P_CLK is generated by causing at least one out of the period of, the number of pulses of, and the pulse width of a P_EXP pulse signal, which is a signal for controlling an exposure period (hereinafter referred to as an "exposure period control signal") to correspond to the exposure period. Alternatively, in a case where the control signal P_CLK is controlled on a pixel basis, the control signal P_CLK can be generated by using both of an input signal P_CLK_IN and the exposure period control signal P_EXP output from the control pulse generation unit or circuit 115. In one embodiment, the control pulse generation unit or circuit 115 has, for example, a frequency divider. This enables simple control, and can reduce an increase in the number of elements.

A signal output from the photoelectric conversion element 102 of each pixel is processed by the signal processing circuit 103.

The signal processing circuit 103 is provided with a counter, a memory, and the like, and the memory holds a digital value.

To read out signals from the memories of the individual pixels in which digital signals are held, the horizontal scanning circuit 111 inputs, into the signal processing circuits 103, a control pulse for sequentially selecting a column.

A pixel of a selected column is selected by the vertical scanning circuit 110, and a signal is output from the signal processing circuit 103 of the pixel to a corresponding one of the signal lines 113.

The signals output to the signal lines 113 are output through an output circuit 114 to a recording unit or a signal processing circuit outside the photoelectric conversion apparatus 100.

In FIG. 2, the photoelectric conversion elements 102 in the pixel region 12 may be arranged in a one-dimensional shape. Even in a case where the number of pixels is one, an effect can be obtained. The case where the number of pixels is one is also included in the disclosure; however, when a photoelectric conversion apparatus has a plurality of pixels, a power consumption reduction effect of the present embodiment can be easily obtained. Each one of the photoelectric conversion elements 102 does not need to have the function of a signal processing unit. For example, one signal processing circuit may be shared by a plurality of photoelectric conversion elements 102, and signal processing may be sequentially performed for the plurality of photoelectric conversion elements 102.

As illustrated in FIGS. 2 and 3, a plurality of signal processing circuits 103 are arranged in a region that overlaps the pixel region 12 in a plan view. The vertical scanning circuit 110, the horizontal scanning circuit 111, the read-out circuit 112, the output circuit 114, and the control pulse generation unit or circuit 115 are arranged so as to overlap a region between the ends of the sensor substrate 11 and the ends of the pixel region 12 in a plan view. In other words, the sensor substrate 11 has the pixel region 12 and a non-pixel region surrounding the pixel region 12. The vertical scanning circuit 110, the horizontal scanning circuit 111, the read-out circuit 112, the output circuit 114, and the control pulse generation unit or circuit 115 are arranged in a region that overlaps the non-pixel region in a plan view.

Note that the arrangement of the signal lines 113, the read-out circuit 112, and the output circuit 114 is not limited to the arrangement illustrated in FIG. 3. For example, the signal lines 113 may be arranged so as to extend in the row direction, and the read-out circuit 112 may be arranged at a position beyond the signal lines 113 and in the direction in which the signal lines 113 extend.

FIGS. 4A and 4B are an example of block diagrams including equivalent circuits of FIGS. 2 and 3. FIG. 4A illustrates an example in which the signal generation unit or circuit 215 is provided so as to be shared by a plurality of pixels. FIG. 4B illustrates an example in which the control signal P_CLK is controllable on a pixel basis.

In FIG. 4A, the photoelectric conversion element 102 including an APD 201 is provided on the sensor substrate 11, and the other members are provided on the circuit substrate 21.

The APD 201 generates, through photoelectric conversion, a charge pair corresponding to incident light. One node out of two nodes of the APD 201 is connected to a control line to which a driving voltage VL (a first voltage) is supplied. The other node out of the two nodes of the APD 201 is connected to a control line to which a driving voltage VH (a second voltage), which is higher than the voltage VL supplied to the anode, is supplied. In FIGS. 4A and 4B, the one node of the APD 201 is an anode, and the other one node of the APD 201 is a cathode. A reverse bias voltage is supplied to the anode and the cathode of the APD 201 such that the APD 201 performs an avalanche multiplication operation. With such a voltage supplied, electric charge generated by incident light causes avalanche multiplication, so that an avalanche current is generated.

Note that, in a case where a reverse bias voltage is supplied, there are Geiger mode and linear mode. In Geiger mode, an APD is operated with a potential difference between the anode and the cathode that is greater than a breakdown voltage. In linear mode, an APD is operated with a potential difference between the anode and the cathode that is near the breakdown voltage or less than or equal to the breakdown voltage.

An APD operated in Geiger mode is called a single-photon avalanche diode (SPAD). For example, the voltage VL (the first voltage) is −30 V, and the voltage VH (the second voltage) is 1 V. The APD 201 may be operated in linear mode or in Geiger mode. In the case of a SPAD, the potential difference is increased compared with the case where an APD is in linear mode, and a withstand voltage effect becomes pronounced. Thus, in one embodiment, a SPAD is used.

A switch 202 is connected to the APD 201 and the control line to which the driving voltage VH is supplied. The switch 202 is connected to one node out of the anode and the cathode of the APD 201.

The switch 202 switches, between a first potential difference and a second potential difference, the potential difference between the anode and the cathode of the APD 201. The first potential difference causes avalanche multiplication, and the second potential difference does not cause avalanche multiplication. In the following, switching from the second potential difference to the first potential difference is also referred to as switching on the switch 202, and switching from the first potential difference to the second potential difference is also referred to as switching off the switch 202. The switch 202 functions as a quenching device. The switch 202 functions as a load circuit (a quenching circuit) at the time of signal multiplication due to avalanche multiplication, and reduces a voltage to be supplied to the APD 201 to suppress avalanche multiplication (a quenching operation). In addition, the switch 202 causes the voltage to be supplied to the APD 201 to return to a predetermined potential (the driving voltage VH) by causing a current corresponding to a voltage drop caused by the quenching operation to flow (a recharge operation). That is, the switch 202 functions as a control circuit that controls occurrence of avalanche multiplication in the APD 201.

The switch 202 can be constituted by, for example, a MOS transistor. In FIGS. 4A and 4B, a case is illustrated in which the switch 202 is a PMOS transistor. The control signal P_CLK supplied from the signal generation unit or circuit 215 to the switch 202 is applied to the gate electrode of the MOS transistor constituting the switch 202. In the present embodiment, the switch 202 is controlled so as to be on or off by controlling the voltage to be applied to the gate electrode of the switch 202.

The signal processing circuit 103 has a waveform shaping unit or circuit 210, a counter circuit 211, and a selection circuit 212. In FIG. 4A, the signal processing circuit 103 has the waveform shaping unit or circuit 210, the counter circuit 211, and the selection circuit 212; however, herein, it is sufficient that the signal processing circuit 103 have at least one out of the waveform shaping unit or circuit 210, the counter circuit 211, and the selection circuit 212.

The waveform shaping unit or circuit 210 shapes a change in the electric potential of the cathode of the APD 201 obtained when a photon is detected, and outputs a pulse signal. An input side node of the waveform shaping unit or circuit 210 is referred to as a node A, and an output side node of the waveform shaping unit or circuit 210 is referred to as a node B. The waveform shaping unit or circuit 210 changes an output potential from the node B in accordance with whether an input potential to the node A is greater than or equal to a predetermined value or lower than the predetermined value. For example, in FIG. 5, when the input potential to the node A becomes a determination threshold or higher, the output potential from the node B becomes a low level. When the input potential to the node A becomes lower than the determination threshold, the output potential from the node B becomes a high level. As the waveform shaping unit or circuit 210, for example, an inverter circuit is used. In FIG. 4A, an example is illustrated in which one inverter is used as the waveform shaping unit or circuit 210; however, a circuit in which a plurality of inverters are connected in series may be used or another circuit achieving a waveform shaping effect may be used.

A quenching operation and a recharge operation can be performed using the switch 202 in response to occurrence of avalanche multiplication in the APD 201; however, depending on the detection timing of a photon, there may be a case where the photon is not determined to be an output signal. For example, suppose a case where avalanche multiplication has occurred in the APD 201, so that the potential of the node A becomes the low level, and a recharge operation is in progress. Generally, the determination threshold of the waveform shaping unit or circuit 210 is set to a higher potential than a potential difference with which avalanche multiplication occurs in the APD 201. When a photon enters in a state where the potential of the node A is lower than the determination threshold due to the recharge operation and is a potential at which avalanche multiplication is possible in the APD 201, avalanche multiplication occurs in the APD 201, so that the voltage of the node A is reduced. That is, the potential of the node A is reduced from a voltage lower than the determination threshold, and thus the output potential from the node B is not changed although a photon is detected. Thus, in spite of occurrence of avalanche multiplication, a photon is not determined to be a signal. In particular, in a high illuminance environment, photons enter in succession in a short period of time, photons are less likely to be determined to be a signal. As a result, in spite of being in a high illuminance environment, a discrepancy tends to occur between the actual number of incident photons and an output signal.

In contrast, even in a case where photons enter the APD 201 in succession in a short period of time, the photons can be determined to be a signal by switching on/off the switch 202 in response to the control signal P_CLK applied to the switch 202. In FIG. 5, an example will be described in which the control signal P_CLK is a periodic pulse signal. In other words, in FIG. 5, an embodiment will be described in which the switch 202 is switched on/off at a predetermined clock frequency. However, an effect in suppressing an increase in power consumption of the photoelectric conversion apparatus can also be obtained even when the pulse signal is not a periodic signal.

The counter circuit 211 counts the number of pulse signals output from the waveform shaping unit or circuit 210 and holds a count value. When a control pulse pRES is supplied via a drive line 213, the signal held by the counter circuit 211 is reset.

A control pulse pSEL is supplied to the selection circuit 212 from the vertical scanning circuit 110 illustrated in FIG. 3 via a drive line 214 illustrated in FIG. 4A (not illustrated in FIG. 3), and switching between electrical connection and disconnection between the counter circuit 211 and the signal line 113 is performed. The selection circuit 212 includes, for example, a buffer circuit for outputting a signal. An output signal OUT illustrated in FIG. 4A is a signal output from the pixel.

A switch such as a transistor may be arranged between the switch 202 and the APD 201 or between the photoelectric conversion element 102 and the signal processing circuit 103 and may be used to perform switching between electrical connection and disconnection. Similarly, a switch such as a transistor may be used to electrically switch between supply of the voltage VH and supply of the voltage VL to the photoelectric conversion element 102.

Note that, as illustrated in FIG. 4B, the signal generation unit or circuit 215 may be provided on a pixel basis. In FIG. 4B, illustration of the waveform shaping unit or circuit 210 and its subsequent circuits illustrated in FIG. 4A and the signal generation unit or circuit 215 is omitted. In FIG. 4B, a pixel includes a logic circuit, and whether or not to supply a pulse signal to the switch 202 is determined. The exposure period control signal P_EXP and the input signal P_CLK_IN, which controls the control signal P_CLK, are input to the logic circuit. An inverted signal is then output. For example, in a case where the exposure period control signal P_EXP is at a low level, and the input signal P_CLK_IN is at a low level, a high level signal is output as the control signal P_CLK. That is, the switch 202 is switched off. In a case where the exposure period control signal P_EXP is at a high level, and the input signal P_CLK_IN is at a high level, a low level signal is output as the control signal P_CLK. That is, the switch 202 is switched on. In a case where one out of the exposure period control signal P_EXP and the input signal P_CLK_IN is at the low level, a high level signal is output as the control signal P_CLK. That is, the switch 202 is switched off. In this manner, the switch is controlled on a pixel basis in one embodiment. Note that in a case where the circuit diagram of FIG. 4B is used, as will be described in a second embodiment below, when an exposure period P becomes a low level, the control signal P_CLK is maintained at a high level. That is, the switch 202 is switched off.

FIG. 5 is a diagram schematically illustrating a relationship among the control signal P_CLK for the switch 202, the potential of the node A, the potential of the node B, and the output signal. In the present embodiment, in a case where the control signal P_CLK is at the high level, the driving voltage VH is less likely to be supplied to the APD 201. In a case where the control signal P_CLK is at the low level, the driving voltage VH is supplied to the APD 201. The control signal P_CLK being at the high level corresponds to, for example, 1 V, and the control signal P_CLK being at the low level corresponds to, for example, 0 V. In a case where the control signal P_CLK is at the high level, the switch 202 is OFF. In a case where the control signal P_CLK is at the low level, the switch 202 is ON. The resistance value of the switch 202 in a case where the control signal P_CLK is at the high level is higher than that in a case where the control signal P_CLK is at the low level. In a case where the control signal P_CLK is at the high level, a recharge operation is less likely to be performed even when avalanche multiplication occurs in the APD 201. Thus, a potential supplied to the APD 201 becomes less than or equal to the breakdown voltage of the APD 201. Thus, the avalanche multiplication operation in the APD 201 is stopped.

As illustrated in FIGS. 4A and 4B, the switch 202 is constituted by one transistor. A quenching operation and a recharge operation are performed by one transistor in one embodiment. As a result, compared with a case where a quenching operation and a recharge operation are performed by different respective circuit elements, the number of circuits can be reduced. In particular, in a case where each pixel has a counter circuit, and a signal from a SPAD is read out on a pixel basis, a circuit area used for a switch is reduced to arrange a counter circuit. Thus, an effect in using one transistor to constitute the switch 202 becomes pronounced.

At a time t1, the control signal P_CLK changes from the high level to the low level, the switch 202 is switched on, and a recharge operation is started in the APD 201 (a recharge state). As a result, the potential of the cathode of the APD 201 transitions to the high level. A potential difference between the potentials applied to the anode and the cathode of the APD 201 enters a state in which avalanche multiplication is possible. The potential of the cathode is identical to that of the node A. Thus, when the potential of the cathode transitions from the low level to the high level, the potential of the node A becomes greater than or equal to the determination threshold at a time t2. In this case, the pulse signal output from the node B is inverted and transitions from the high level to the low level. Thereafter, the APD 201 enters a state in which a potential difference of VH–VL is applied thereto, VH and VL being driving voltages. The level of the control signal P_CLK becomes HIGH, and the switch 202 is switched off.

Next, when a photon is incident on the APD 201 at a time t3, avalanche multiplication occurs in the APD 201, and the voltage of the cathode drops. That is, the voltage of the node A drops. When the amount of voltage drop further increases, and the voltage difference applied to the APD 201 decreases, the avalanche multiplication in the APD 201 stops as indicated at the time t2, and the voltage level of the node A does not fall below a certain value. When the voltage of the node A becomes lower than the determination threshold midway while the voltage of the node A is dropping, the voltage of the node B transitions from the low level to the high level. That is, part of the output waveform exceeding the determination threshold at the node A is shaped by the waveform shaping unit or circuit 210 and is output as a signal from the node B. The signal is counted by the counter circuit 211, and a count value of a count signal output from the counter circuit 211 is increased by 1 LSB.

A photon is incident on the APD 201 between the time t3 and a time t4; however, the switch 202 is Off, the node A is in a floating state (a standby state), and the voltage applied to the APD 201 does not have a potential difference with which avalanche multiplication is possible. Thus, the voltage level of the node A does not exceed the determination threshold.

At the time t4, the control signal P_CLK changes from the high level to the low level, and the switch 202 is switched on. As a result, a current that offsets the amount of voltage drop from the driving voltage VH flows into the node A, and the voltage of the node A transitions to the original voltage level. In this case, the voltage of the node A is greater than or equal to the determination threshold at a time t5, and thus the pulse signal for the node B is inverted and transitions from the high level to the low level.

At a time t6, the node A becomes statically determinate at the original voltage level, and the control signal P_CLK transitions from the low level to the high level. Thus, the switch 202 is switched off. Even after the time t6, as described from the time t1 to the time t6, the potentials of the individual nodes and the signal line change in accordance with the control signal P_CLK or an incident photon.

In the following, photoelectric conversion apparatuses according to individual embodiments will be described.

First Embodiment

A first embodiment will be described using FIGS. 6A to 9.

In the present embodiment, the signal generation unit or circuit 215 generates a plurality of control signals P_CLK. The individual control signals P_CLK are connected to pixels in predetermined regions within a screen in advance. In a photoelectric conversion apparatus according to the present embodiment, P_CLK is different from region to region within the screen, and a recharge operation is performed on each pixel in each region by using P_CLK corresponding to the region. That is, each region (each pixel region) within the screen is a unit (or area, region, subregion) of control and controlled by the corresponding control signal P_CLK.

FIGS. 6A to 6C illustrate an example of control positions, within the screen, of control signals P_CLK_0, P_CLK_1, P_CLK_2, P_CLK_3, P_CLK_4, P_CLK_5, P_CLK_6, and P_CLK_7 according to the first embodiment.

As illustrated in FIG. 6A, the screen is divided into lateral bands (bands extending in the pixel row direction), which form eight regions in total. The plurality of control signals P_CLK_0 to P_CLK_7 are input, on a band basis, to the plurality of pixels included in the respective bands. For example, when the uppermost band is treated as a first pixel region, and the second band from the top is treated as a second pixel region in FIG. 6A, the control signal P_CLK_0 is input to first pixels arranged in the first pixel region, and the control signal P_CLK_1 is input to second pixels arranged in the second pixel region. The control signal P_CLK_3 and its subsequent control signals are also similarly input to the corresponding bands. Each of the control signals P_CLK_0 to P_CLK_7 is generated by the signal generation unit or circuit 215. For each band, the same control signal P_CLK is input to the plurality of pixel in the band. It is sufficient that a value suitable for the system be set to the number of rows of pixels in each band, and the value may be one or two or more. In the present description, the number of bands within the screen is eight; however, the number of bands within the screen is not limited thereto.

The division direction of the screen is not limited to a lateral direction, and the screen may also be divided in a vertical direction (a pixel column direction). As illustrated in FIG. 6B, the screen is divided into vertical bands, which form eight regions in total. The plurality of control signals P_CLK_0 to P_CLK_7 are input to the plurality of pixels included in the respective bands. Each of the control signals P_CLK_0 to P_CLK_7 is generated by the signal generation unit or circuit 215. For each band, the same control signal P_CLK is input to the plurality of pixel in the band. It is sufficient that a value suitable for the system be set to the number of columns in each band, and the value may be one or two or more. The number of bands within the screen is also not limited to eight.

Furthermore, the screen may also be divided into blocks arranged two-dimensionally so as to have a plurality of rows and a plurality of columns. As illustrated in FIG. 6C, the screen is divided into rectangular blocks, which form eight regions in total. The plurality of control signals P_CLK_0 to P_CLK_7 are input to the plurality of pixels included in the respective blocks. Each of the control signals P_CLK_0 to P_CLK_7 is generated by the signal generation unit or circuit 215. For each band, the same control signal P_CLK is input to the plurality of pixel in the band. It is sufficient that a value suitable for the system be set to the number of pixels or the aspect ratio of each block. Moreover, the shape of the block is not limited to a rectangle or a square, and may also be a parallelogram or a diamond or may also be a region formed by combining some or all of these shapes.

The number of blocks within the screen is also not limited to eight.

Figure 7A:
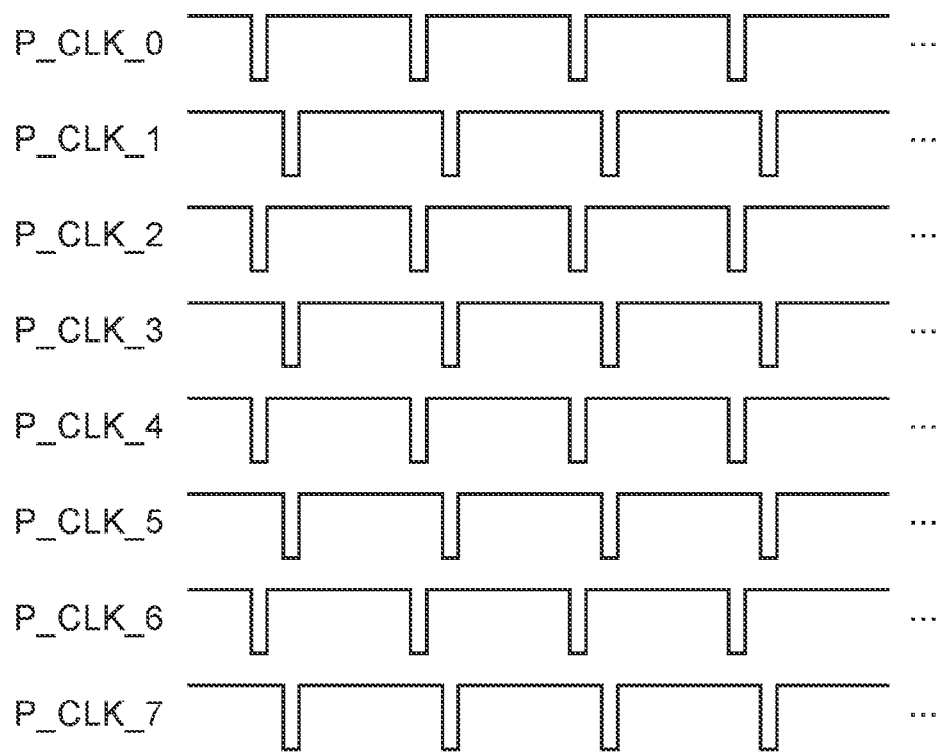
FIGS. 7A and 7B are timing chart diagrams of the photoelectric conversion apparatus according to the first embodiment.
Figure 7B:
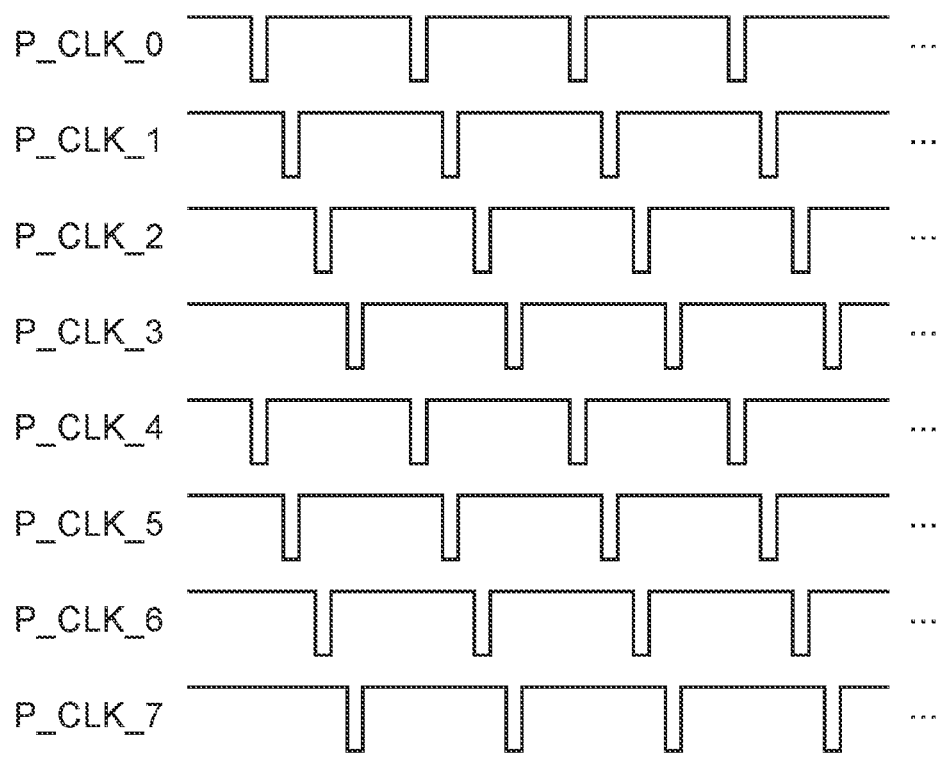

FIGS. 7A and 7B are timing chart diagrams of the plurality of control signals P_CLK_0 to P_CLK_7 in the first embodiment.

In FIG. 7A, among the plurality of control signals P_CLK_0 to P_CLK_7 corresponding to the respective regions and output by the signal generation unit or circuit 215, the phases of the control signals corresponding to odd-number regions differ from those of the control signals corresponding to even-number regions. Moreover, the control signals corresponding to the odd-number regions have the same phase, and the control signals corresponding to the even-number regions have the same phase. In other words, the different phases are repeated in units, or groups, of two regions, which are the odd-number regions and the even-number regions. As a result, recharge operation timings of the respective regions in response to the pulses of the control signals are also different from each other in units of two regions.

In FIG. 7A, for example, a timing at which the control signal P_CLK_0, which is a pulse signal, transitions from a first level (HIGH) to a second level (LOW) differs from a timing at which the control signal P_CLK_1, which is a pulse signal, transitions from the first level to the second level. The same or similar applies to the control signal P_CLK_2 and its subsequent control signals. Timings at which the control signals corresponding to the odd-number regions transition between the levels differ from timings at which the control signals corresponding to the even-number regions transition between the levels. In contrast, the timings at which the control signals, which are pulse signals, corresponding to the odd-number regions transition between the levels match each other, and the timings at which the control signals, which are pulse signals, corresponding to the even-number regions transition between the levels match each other.

A phase difference between the control signal P_CLK_0 and the control signal P_CLK_1 can also be described as in the following. For example, the leftmost pulse of the control signal P_CLK_0 in FIG. 7A is treated as a first pulse, and the second pulse of the control signal P_CLK_0 from the left is treated as a second pulse. When the leftmost pulse of the control signal P_CLK_1 in FIG. 7A is treated as a third pulse, the third pulse is output in a period from when the first pulse is output to when the second pulse is output. Furthermore, when the third pulse of the control signal P_CLK_0 from the left is treated as a fourth pulse, and the second pulse of the control signal P_CLK_1 from the left is treated as a fifth pulse, the fifth pulse is output in a period from when the second pulse is output to when the fourth pulse is output. Note that, in FIG. 7A, the pulse width of the control signal P_CLK_0 and the pulse width of the control signal P_CLK_1 are constant, and the interval of the control signal P_CLK_0, which is a pulse signal, and that of the control signal P_CLK_1, which is a pulse signal, are constant.

For example, a case is considered in which the control signals P_CLK_0 to P_CLK_7 illustrated in FIG. 7A are input to the pixel regions arranged as illustrated in FIG. 6A. Timings at which the control signal P_CLK input to the first pixels arranged in the first pixel region (a first pixel row) transitions between the levels differ from timings at which the control signal P_CLK input to the second pixels arranged in the second pixel region (a second pixel row) transitions between the levels, the control signals P_CLK being pulse signals. Moreover, timings at which the control signal P_CLK input to third pixels arranged in a third pixel region (a third pixel row) different from the first and second pixel regions transitions between the levels match the timings at which the control signal P_CLK input to the first pixels transitions between the levels, the control signals P_CLK being pulse signals.

FIG. 7B illustrates a timing chart diagram for a case where control signals having different phases are output in units of four rows. The two ways in which the phases of the control signals P_CLK_0 to P_CLK_7 are shifted from each other have been described as examples; however, the variety of ways in which these phases are shifted from each other is wide and is not limited to these.

As illustrated in FIGS. 7A and 7B, the recharge operation timings of the individual regions are shifted from each other by shifting, from each other, the phases of the control signals P_CLK_0 to P_CLK_7 output from the signal generation unit or circuit 215. As a result, timings at which the amounts of current corresponding to voltage drops caused by quenching operations (recharge currents) in the individual regions flow are also shifted from each other. Since the recharge currents flow in the individual regions at different timings, the peak value of power consumption can be reduced, compared with a case where recharge currents flow into all the pixels at the same time.

Moreover, in the case of high illuminance, avalanche multiplication occurs in synchronization with a timing at which a recharge operation is complete. Thus, due to recharge operation timings being shifted from each other using the first embodiment, timings at which avalanche currents flow are also shifted from each other, so that the peak value of power consumption can be reduced.

Figure 8A:
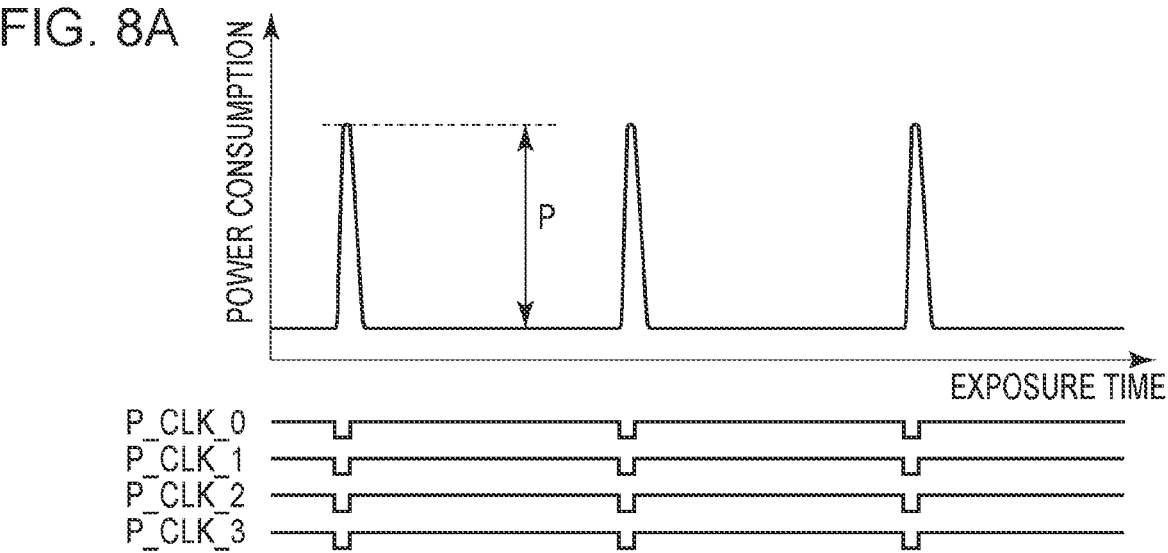
FIGS. 8A to 8C are conceptual diagrams of power consumption of the photoelectric conversion apparatus according to the first embodiment.
Figure 8B:
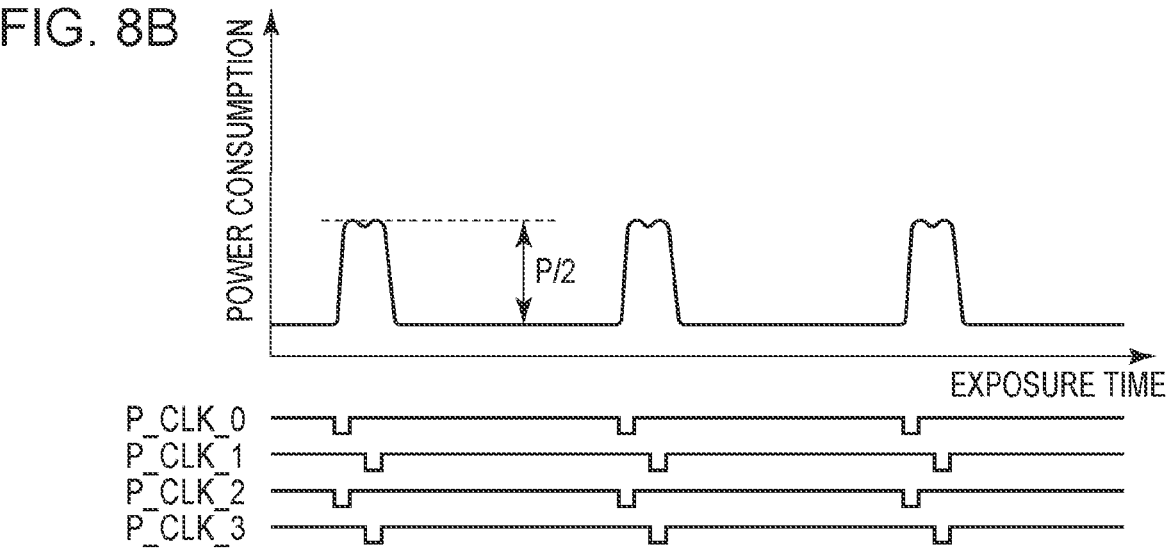
Figure 8C:
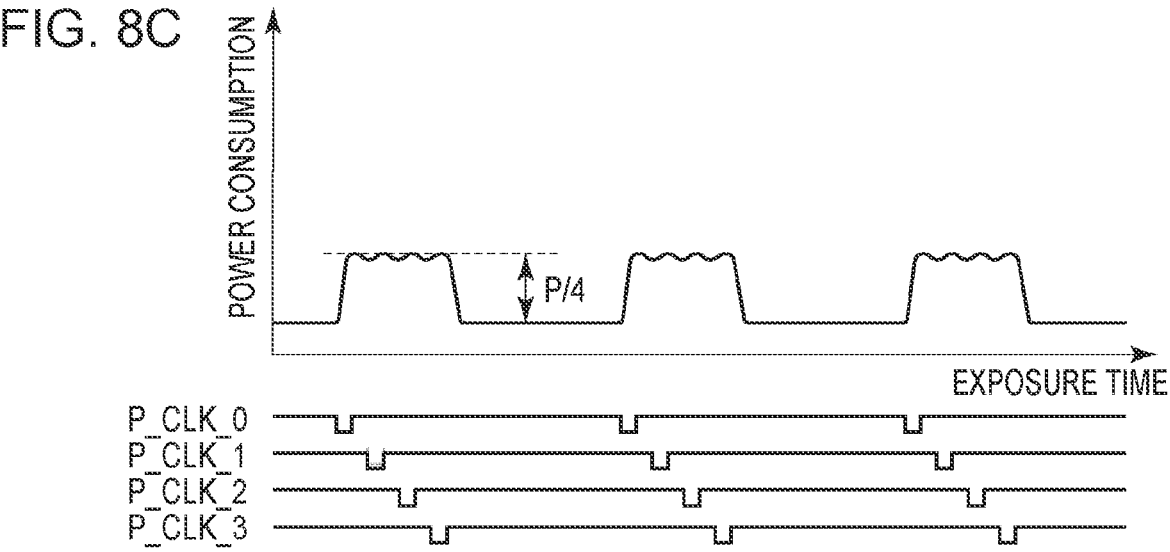

FIGS. 8A, 8B, and 8C illustrate conceptual diagrams of the way in which power consumption is flatten.

FIG. 8A is a diagram illustrating power consumption with respect to exposure time for a case where the disclosure is not used, and the same control signal P_CLK is input to all the pixels within the screen. The height of a rising edge of power consumption due to a recharge current and an avalanche current is P.

FIG. 8B illustrates a case where the plurality of control signals P_CLK_0 to P_CLK_7 illustrated in FIG. 7A are used.

The height of a rising edge of power consumption due to a recharge current and an avalanche current is P/2 with respect to P in FIG. 8A, and the peak value of power consumption is reduced. The reason why the height of the rising edge of power consumption is P/2 is because timings at which the plurality of control signals P_CLK_0 to P_CLK_7, which are pulse signals, transition between the levels are made different from each other in units of two regions, which are odd-number regions and even-number regions.

FIG. 8C illustrates a case where the plurality of control signals P_CLK_0 to P_CLK_7 illustrated in FIG. 7B are used. Timings at which the plurality of control signals P_CLK_0 to P_CLK_7 illustrated in FIG. 7B, which are pulse signals, transition between the levels are made different from each other in units of four regions. Thus, the height of a rising edge of power consumption due to a recharge current and an avalanche current is P/4 with respect to P in FIG. 8A. Compared with the case corresponding to FIG. 7A, the peak value of power consumption is further reduced.

Figure 9:
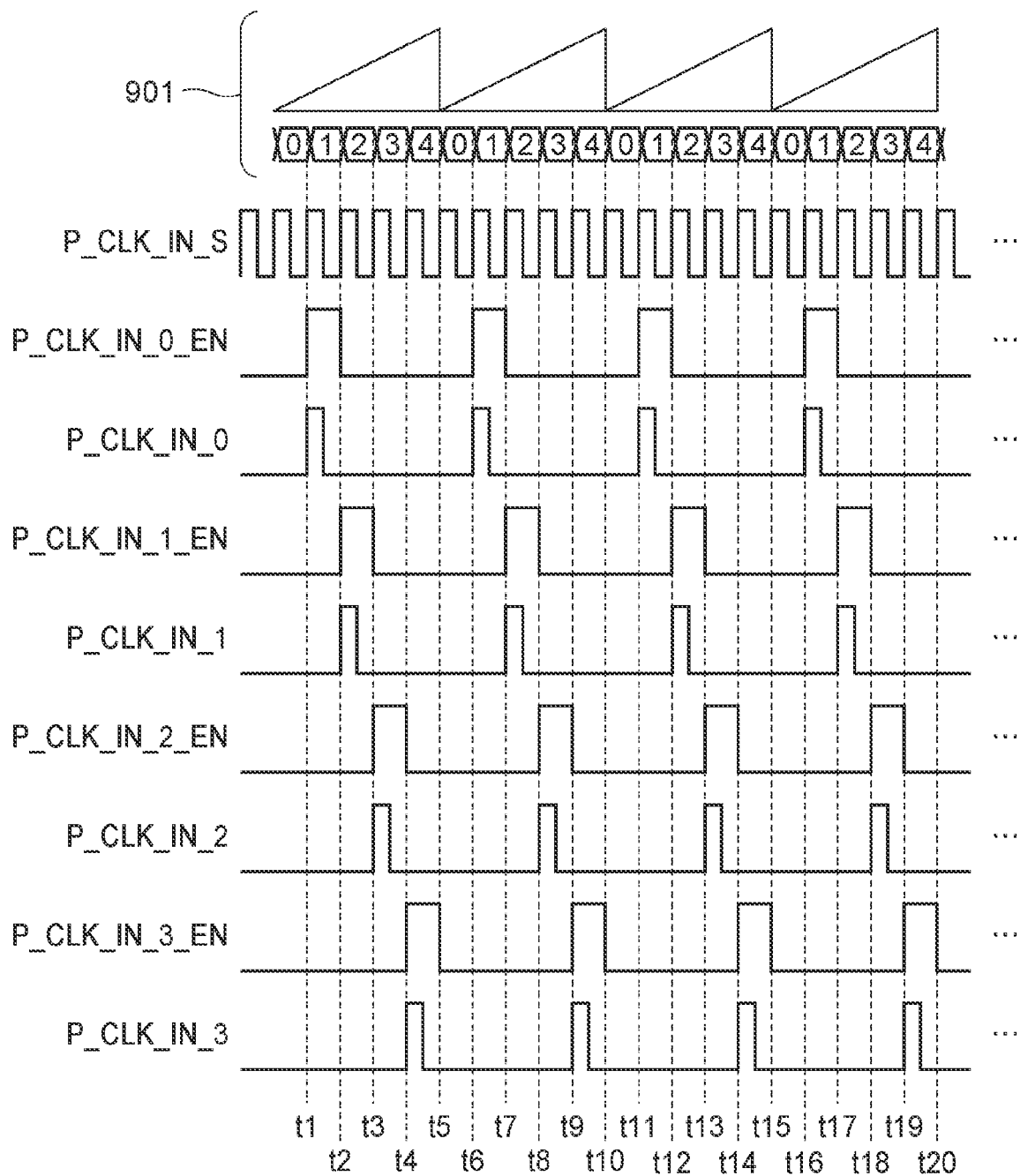
FIG. 9 is a timing chart diagram of the photoelectric conversion apparatus according to the first embodiment.

FIG. 9 is a timing chart diagram illustrating the way in which the control pulse generation unit or circuit 115 generates a plurality of input signals P_CLK_IN.

The signal generation unit or circuit 215 generates, using the circuit illustrated in FIG. 4B, a control signal P_CLK from an input signal P_CLK_IN and an exposure time control signal P_EXP. That is, the plurality of control signals P_CLK_0 to P_CLK_7, which are illustrated in FIGS. 7A and 7B and whose phases are shifted from each other, can be generated by shifting, from each other, the phases of a plurality of input signals P_CLK_IN_0 to P_CLK_IN_7 generated by the control pulse generation unit or circuit 115. FIG. 9 illustrates the way in which the control pulse generation unit or circuit 115 generates the plurality of control signals P_CLK_0 to P_CLK_3 that are illustrated in FIG. 7B and whose phases are shifted from each other in an alternating manner in units of four regions. The plurality of control signals P_CLK_4 to P_CLK_7 are in phase with the plurality of control signals P_CLK_0 to P_CLK_3, and thus description will be omitted.

The control pulse generation unit or circuit 115 generates the input signals P_CLK_IN as gapped clocks obtained by dividing a source clock P_CLK_IN_S at a certain division ratio. The source clock P_CLK_IN_S may be a driving clock for the control pulse generation unit or circuit 115, or may be a clock dedicated to P_CLK_IN_S and input from a PLL, which is not illustrated. The division ratio may be a fixed value or may be set through, for example, serial communication in subsequent processing, which is not illustrated.

The control pulse generation unit or circuit 115 has a frequency division counter 901. The frequency division counter 901 counts up at rising edges of the source clock P_CLK_IN_S, clears at the division ratio with which the input signals P_CLK_IN are generated, and operates as a cyclic counter.

In FIG. 9, the input signals P_CLK_IN are generated by dividing the source clock P_CLK_IN_S at a division ratio of 5. Thus, the frequency division counter 901 counts from 0 to 4 in cycles in accordance with a division ratio of 5. The input signal P_CLK_IN_0 is generated by an enable signal P_CLK_IN_0_EN releasing a mask of the source clock P_CLK_IN_S, the enable signal P_CLK_IN_0_EN becoming HIGH when the frequency division counter 901 has a predetermined value. Similarly, the input signals P_CLK_IN_1 to P_CLK_IN_3 are generated by enable signals P_CLK_IN_1_EN to P_CLK_IN_3_EN, respectively, releasing the mask of the source clock P_CLK_IN_S. The values of the frequency division counter 901 that indicate in which periods the plurality of enable signals P_CLK_IN_0_EN to P_CLK_IN_3_EN become HIGH may be fixed values or may be set through, for example, serial communication in subsequent processing, which is not illustrated.

In FIG. 9, the enable signal P_CLK_IN_0_EN corresponding to the input signal P_CLK_IN_0 becomes HIGH in a period when the frequency division counter 901 is 1. The enable signal P_CLK_IN_1_EN corresponding to the input signal P_CLK_IN_1 becomes HIGH in a period when the frequency division counter 901 is 2. The enable signal P_CLK_IN_2_EN corresponding to the input signal P_CLK_IN_2 becomes HIGH in a period when the frequency division counter 901 is 3. The enable signal P_CLK_IN_3_EN corresponding to the input signal P_CLK_IN_3 becomes HIGH in a period when the frequency division counter 901 is 4.

At a time t1, the frequency division counter 901 is 0, and the enable signal P_CLK_IN_0_EN is asserted. At a time t2, the frequency division counter 901 is 1, and the enable signal P_CLK_IN_0_EN is deasserted. As a result, the enable signal P_CLK_IN_0_EN is HIGH in a period from the time t1 to the time t2. In the period from the time t1 to the time t2, the mask of the source clock P_CLK_IN_S is released by the enable signal P_CLK_IN_0_EN, and the input signal P_CLK_IN_0 is generated.

At the time t2, the frequency division counter 901 is 1, and the enable signal P_CLK_IN_1_EN is asserted. At a time t3, the frequency division counter 901 is 2, and the enable signal P_CLK_IN_1_EN is deasserted. As a result, the enable signal P_CLK_IN_1_EN is HIGH in a period from the time t2 to the time t3. In the period from the time t2 to the time t3, the mask of the source clock P_CLK_IN_S is released by the enable signal P_CLK_IN_1_EN, and the input signal P_CLK_IN_1 is generated.

At the time t3, the frequency division counter 901 is 2, and the enable signal P_CLK_IN_2_EN is asserted. At a time t4, the frequency division counter 901 is 3, and the enable signal P_CLK_IN_2_EN is deasserted. As a result, the enable signal P_CLK_IN_2_EN is HIGH in a period from the time t3 to the time t4. In the period from the time t3 to the time t4, the mask of the source clock P_CLK_IN_S is released by the enable signal P_CLK_IN_2_EN, and the input signal P_CLK_IN_2 is generated.

At the time t4, the frequency division counter 901 is 3, and the enable signal P_CLK_IN_3_EN is asserted. At a time t5, the frequency division counter 901 is 4, and the enable signal P_CLK_IN_3_EN is deasserted. As a result, the enable signal P_CLK_IN_3_EN is HIGH in a period from the time t4 to the time t5. In the period from the time t4 to the time t5, the mask of the source clock P_CLK_IN_S is released by the enable signal P_CLK_IN_3_EN, and the input signal P_CLK_IN_3 is generated.

The operation from the time t1 to the time t5 has been described above; however, hereinafter, the operation from a time t6 to a time t20 is repetitions of the operation from the time t1 to the time t5, and thus description will be omitted.

In order to simplify description, description has been made supposing that the plurality of control signals P_CLK_0 to P_CLK_7 are output from the signal generation unit or circuit 215; however, for example, each pixel may have the signal generation unit or circuit 215. Even in that case, similarly, substantially the same effect can also be obtained by shifting, from each other, the phases of the plurality of input signals P_CLK_IN_0 to P_CLK_IN_7 generated by the control pulse generation unit or circuit 115.

In the first embodiment above, timings of recharge operations of the individual regions are shifted from each other by shifting, from each other, the phases of the plurality of control signals P_CLK_0 to P_CLK_7 output by the signal generation unit or circuit 215. As a result, timings at which recharge currents flow in the individual regions are also shifted from each other. Since the recharge currents flow in the individual regions at different timings, the peak value of power consumption can be reduced, compared with a case where recharge currents flow into all the pixels at the same time.

Moreover, in the case of high illuminance, avalanche multiplication occurs in synchronization with a timing at which a recharge operation is complete. Thus, due to recharge operation timings being shifted from each other using the first embodiment, timings at which avalanche currents flow in the respective regions can also be shifted from each other, so that the peak value of power consumption can be reduced.

Second Embodiment

A second embodiment will be described using FIGS. 10A to 11C.

In the first embodiment, as illustrated in FIGS. 6A to 6C, the screen is divided into a plurality of regions, and the signal generation unit or circuit 215 generates, for each region, a common control signal P_CLK for the plurality of pixels included in the region. That is, one kind of control signal P_CLK and one control signal line for receiving the control signal P_CLK are assigned to each region.

In contrast, in the second embodiment, a plurality of control signals P_CLK are assigned to each region. For example, some of a plurality of pixels arranged in each region share a first control signal line, and some other pixels among the plurality of pixels in the region share a second control signal line. In this case, control signal lines may be provided so as to correspond to a plurality of control signals on a one-to-one basis. A plurality of types of control signal P_CLK may be input through one control signal line. In order to simplify description, description will be made in the following such that two kinds of control signals P_CLK are assigned to each region; however, the number of assigned control signals is not limited to two. For example, four kinds of control signals P_CLK may be assigned to each region.

FIGS. 10A to 10C illustrate control positions of a plurality of control signals P_CLK_0 to P_CLK_15 within the screen in the second embodiment. FIGS. 10A to 10C differ from FIGS. 6A to 6C in that two kinds of control signals P_CLK are assigned to each region. Since a plurality of control signals P_CLK are assigned to each region, the phases of the plurality of control signals P_CLK can be shifted from each other within each region, so that the peak value of power consumption can be reduced in each region. As a result, in a use case in which a certain region of an image is specified and output, an effect equivalent to or higher than that of the first embodiment can be obtained.

FIGS. 11A, 11B, and 11C illustrate examples of the way in which the control signals P_CLK_0 and P_CLK_1 are assigned in the region in the second embodiment. In this case, in order to simplify description, the region is a rectangular region having 4×4 pixels; however, the variety of regions is wide, and the region is not limited to this. Description regarding the control signals P_CLK_2 to P_CLK_15 in FIGS. 10A, 10B, and 10C is substantially the same as that of the plurality of control signals P_CLK_0 and P_CLK_1, and thus description will be omitted.

In FIG. 11A, the plurality of control signals P_CLK_0 and P_CLK_1 are assigned on a row basis in the region. That is, P_CLK_0 is input to odd rows, and P_CLK_1 is input to even rows.

In FIG. 11B, the plurality of control signals P_CLK_0 and P_CLK_1 are assigned on a column basis. P_CLK_0 is input to odd columns, and P_CLK_1 is input to even columns.

In FIG. 11C, the control signals P_CLK_0 and P_CLK_1 are assigned in a check pattern manner.

In this manner, regarding the pixels arranged in each region, timings at which the control signals P_CLK, which are pulse signals, transition between the levels are made different from each other on a pixel basis. As a result, the peak value of power consumption in each region can be reduced. Note that, the variety of ways in which the control signals P_CLK_0 and P_CLK_1 are assigned in the region is wide and is not limited to these examples.

For example, when a moving image is captured, a region in which the phases of the control signals P_CLK are shifted from each other may be changed on a frame basis, and also the way in which the phases of the plurality of control signals P_CLK are shifted from each other in each region may be changed on a frame basis. As a result, randomness is added to the moving image, and effects on image quality such as a striped pattern or the like due to regularity can be reduced.

As illustrated in the second embodiment above, by assigning the plurality of control signals P_CLK to each region, the phases of the control signals P_CLK can be shifted from each other in each region. As a result, the peak value of power consumption can be reduced in each region.

Third Embodiment

A third embodiment will be described using FIGS. 12A to 13B. The third embodiment is an embodiment in which it is supposed that the disclosure is implemented in image capturing using a global shutter operation.

When the phases of a plurality of control signals P_CLK are shifted from each other, the level of simultaneity of photon counting may be an issue. The issue of the level of simultaneity of photon counting will be described using image distortion due to a rolling shutter.

Figure 12A:
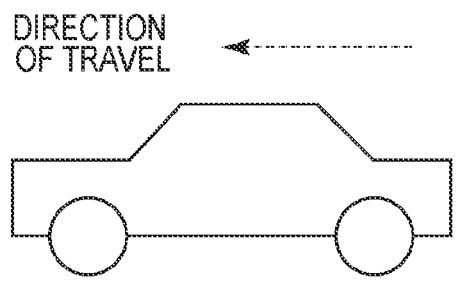
FIGS. 12A and 12B are conceptual diagrams illustrating image distortion due to a rolling shutter.
Figure 12B:
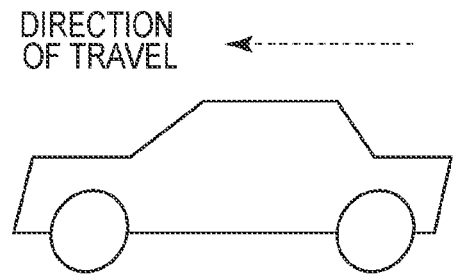

FIGS. 12A and 12B are conceptual diagrams illustrating image distortion due to a rolling shutter.

FIG. 12A is a conceptual diagram illustrating an image of a subject moving leftward, the image having been captured using a global shutter. In the case of a global shutter, photon counting is performed on all the rows simultaneously, and thus distortion does not occur in the top portion and the bottom portion of an image.

In contrast, FIG. 12B is a conceptual diagram illustrating an image of the subject moving leftward, the image having been captured using a rolling shutter. Unlike the case of a global shutter, in the case of a rolling shutter, photon counting is performed on a row basis from the top of an image. Thus, a photon counting period of the top portion of the image differs from that of the bottom portion of the image. In a case where the subject has moved in the meantime, row-based differences between the photon counting periods are captured as subject distortion.

In a case where the phases of the plurality of control signals P_CLK are shifted from each other by a large amount, this may affect image quality. Thus, when image capturing is performed using a global shutter, a person may think such that they want the phases of the plurality of control signals P_CLK to be shifted from each other as little as possible.

Figure 13A:
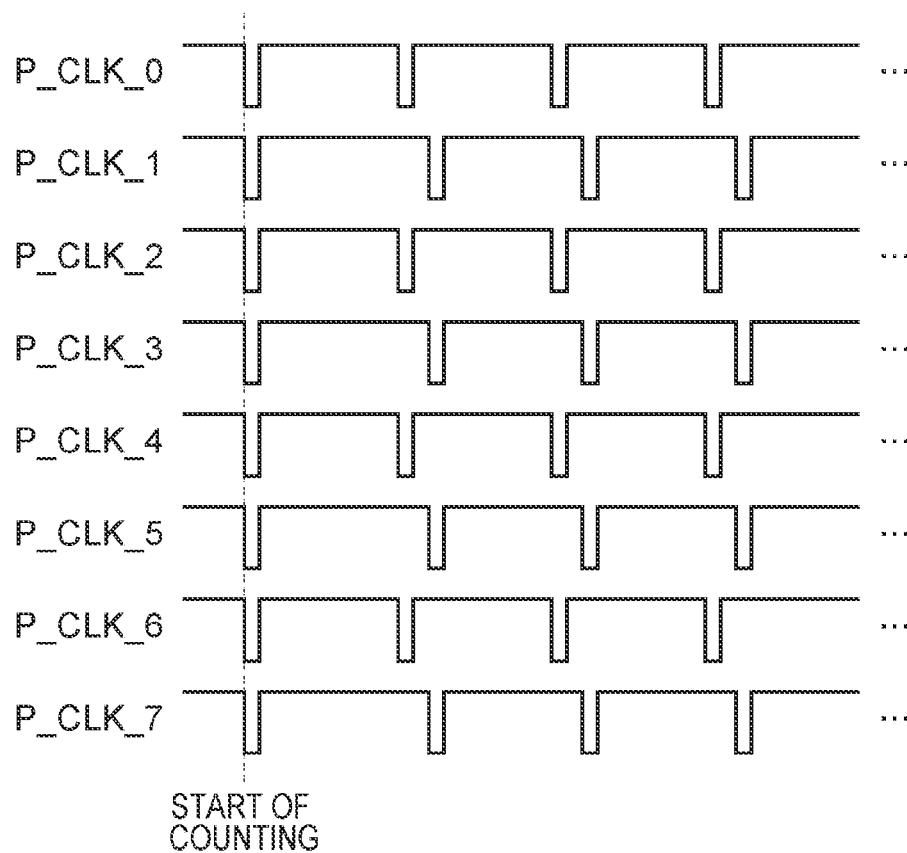
FIGS. 13A and 13B are timing chart diagrams of a photoelectric conversion apparatus according to a third embodiment.
Figure 13B:
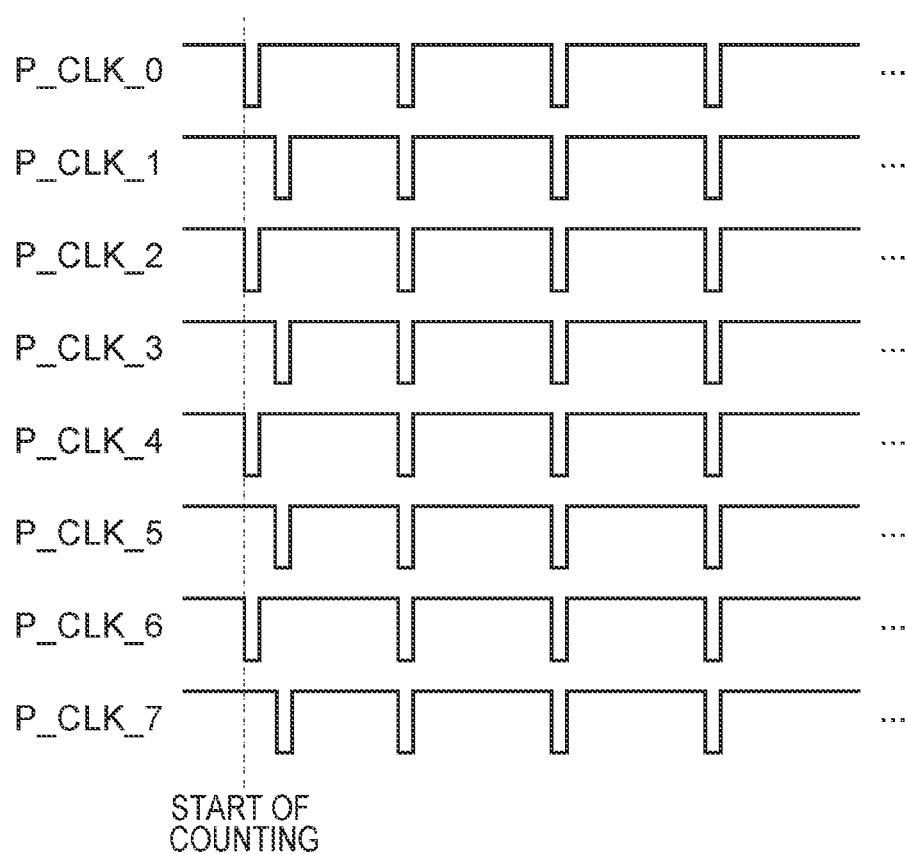

FIGS. 13A and 13B are timing chart diagrams of the plurality of control signals P_CLK_0 to P_CLK_7 in the third embodiment. The phases of the plurality of control signals P_CLK are set through, for example, serial communication in subsequent processing, which is not illustrated.

In FIG. 13A, the phases of the plurality of control signals P_CLK are not shifted from each other at the start of counting so as not to reduce the level of simultaneity of photon counting because image quality is likely to be affected at the start of counting. In other words, timings at which the control signals P_CLK, which are pulse signals, transition between the levels for the first time after scanning for a global shutter operation is started are made to match each other between the plurality of regions. In still other words, for example, the second pulse of the control signal P_CLK_0 from the left in FIG. 13A is treated as a first pulse, and the third pulse of the control signal P_CLK_0 from the left in FIG. 13A is treated as a second pulse. When the second pulse of the control signal P_CLK_1 from the left in FIG. 13A is treated as a third pulse, the third pulse is input in a period from when the first pulse is output to when the second pulse is output. Furthermore, when the leftmost pulse of the control signal P_CLK_0 from the left is treated as a sixth pulse, and the leftmost pulse of the control signal P_CLK_1 is treated as a seventh pulse, the timing at which the sixth pulse transitions between the levels matches the timing at which the seventh pulse transitions between the levels. As a result, in a case where subject distortion may occur, the distortion can be reduced.

In contrast, as the period of time since the previous recharge operation becomes longer, a larger amount of recharge current flows.

The point in time at which the period of time since the previous recharge operation becomes longest is the start of counting. That is, the point in time at which the largest amount of recharge current flows is the start of counting.

In FIG. 13B, timings at which the plurality of control signals P_CLK, which are pulse signals, transition between the levels are made different from each other only at the start of counting at which the largest amount of recharge current flows. In the period other than that, timings at which the plurality of control signals P_CLK, which are pulse signals, transition between the levels are not made different from each other so as not to reduce the level of simultaneity of photon counting. In other words, timings at which the control signals P_CLK, which are pulse signals, transition between the levels for the first time after scanning for a global shutter operation is started are made different from each other between the plurality of regions. In still other words, for example, the leftmost pulse of the control signal P_CLK_0 in FIG. 13B is treated as a first pulse, and the second pulse of the control signal P_CLK_0 from the left is treated as a second pulse. When the leftmost pulse of the control signal P_CLK_1 in FIG. 13B is treated as a third pulse, the third pulse is input in a period from when the first pulse is output to when the second pulse is output. In this case, the timing at which the first pulse transitions between the levels is a timing at which the control signal P_CLK_0, which is a pulse signal, transitions between the levels for the first time after scanning for a global shutter operation is started about the pixels to which P_CLK_0 is input.

Moreover, the timing at which the third pulse transitions between the levels is a timing at which the control signal P_CLK_1, which is a pulse signal, transitions between the levels for the first time after scanning for a global shutter operation is started about the pixels to which P_CLK_1 is input. Through the operation illustrated in FIG. 13B, an effect in reducing the peak value of power consumption can be obtained.

With the third embodiment above, in a case where subject distortion may occur, this distortion can be reduced by controlling the phases of the plurality of control signals P_CLK. Moreover, the peak value of power consumption can be reduced.

Fourth Embodiment

As illustrated in FIGS. 12A and 12B, when the phases of a plurality of control signals P_CLK are shifted from each other, the level of simultaneity of photon counting may be an issue. As a fourth embodiment, an application using feedback control performed in subsequent processing, which is not illustrated, will be described. The phases of the plurality of control signals P_CLK are set through, for example, serial communication in subsequent processing, which is not illustrated.

An example of an electronic device in which the photoelectric conversion apparatus 100 is used may be a digital camera. For digital cameras, an automatic exposure (AE) function is known through which exposure is automatically adjusted such that a captured image becomes a moderately bright image regardless of the brightness of a subject. To realize this function, in subsequent processing, which is not illustrated, subject brightness information such as the integrals of pixel values is acquired from the photoelectric conversion apparatus 100.

Using substantially the same way of thinking, the peak value of power consumption can be reduced by controlling the control signals P_CLK in accordance with subject brightness information acquired in the subsequent processing, which is not illustrated.

That is, in a case where it is determined that the current frame (a first frame) has high illuminance, power consumption is high. Thus, a higher priority is assigned to power reduction than to maintaining or improving image quality in the next frame (a second frame), and timings at which the plurality of control signals P_CLK, which are pulse signals, transition between the levels are made different from each other. As a result, the peak value of power consumption can be reduced. In contrast, in a case where it is determined that the current frame does not have high illuminance, power consumption is low. Thus, a higher priority is assigned to maintaining or improving image quality than to power reduction in the next frame. That is, timings at which the plurality of control signals P_CLK, which are pulse signals, transition between the levels are not made different from each other so as not to reduce the level of simultaneity of photon counting. This can reduce subject distortion that may occur due to the level of simultaneity of photon counting being reduced.

The above-described control of the control signals P_CLK may be performed on a region basis. That is, power consumption is high in a region for which subject brightness information is acquired in subsequent processing, which is not illustrated, and it is determined that the current frame has high illuminance. Thus, a higher priority is assigned to power reduction than to maintaining or improving image quality in the next frame, and the phases of the plurality of control signals P_CLK are shifted from each other, so that the peak value of power consumption can be reduced. In contrast, power consumption is low in a region for which it is determined that the current frame does not have high illuminance. Thus, a higher priority is assigned to maintaining or improving image quality than to power reduction in the next frame. That is, timings at which the plurality of control signals P_CLK, which are pulse signals, transition between the levels are not made different from each other so as not to reduce the level of simultaneity of photon counting. This can reduce subject distortion that may occur due to the level of simultaneity of photon counting being reduced.

Alternatively, in accordance with digital camera imaging conditions such as power saving mode, F-number, and International Organization for Standardization (ISO) speed, feedforward control may be performed as to whether or not to shift the phases of the plurality of control signals P_CLK from each other.

For example, in a case where the power saving mode is ON, a higher priority is assigned to power reduction than to maintaining or improving image quality, and timings at which the plurality of control signals P_CLK, which are pulse signals, transition between the levels are made different from each other. As a result, the peak value of power consumption can be reduced. In contrast, in a case where the power saving mode is OFF, a higher priority is assigned to maintaining or improving image quality than to power reduction, and timings at which the plurality of control signals P_CLK, which are pulse signals, transition between the levels are not made different from each other so as not to reduce the level of simultaneity of photon counting. As a result, in a case where subject distortion may occur, this distortion can be reduced.

In a case where the F-number of a digital camera is low, illuminance tends to be high. Thus, a higher priority is assigned to power reduction than to maintaining or improving image quality, and timings at which the plurality of control signals P_CLK, which are pulse signals, transition between the levels are made different from each other. As a result, the peak value of power consumption can be reduced. In contrast, a case where the F-number is high, illuminance tends to be low. Thus, a higher priority is assigned to maintaining or improving image quality than to power reduction, and timings at which the plurality of control signals P_CLK, which are pulse signals, transition between the levels are not made different from each other so as not to reduce the level of simultaneity of photon counting. As a result, in a case where subject distortion may occur, this distortion can be reduced.

Similarly, in a case where the ISO speed of a digital camera is low, the case corresponds to a situation in which illuminance is high. Thus, a higher priority is assigned to power reduction than to maintaining or improving image quality, and timings at which the plurality of control signals P_CLK, which are pulse signals, transition between the levels are made different from each other. As a result, the peak value of power consumption can be reduced. In contrast, in a case where the ISO speed is high, the case corresponds to a situation in which illuminance is low. Thus, a higher priority is assigned to maintaining or improving image quality than to power reduction, and timings at which the plurality of control signals P_CLK, which are pulse signals, transition between the levels are not made different from each other so as not to reduce the level of simultaneity of photon counting. As a result, in a case where subject distortion may occur, this distortion can be reduced.

In the fourth embodiment above, in a case where subject distortion may occur, this distortion can be reduced by controlling the phases of the plurality of control signals P_CLK in accordance with the brightness of the subject.

Fifth Embodiment

As illustrated in FIGS. 12A and 12B, when the phases of the plurality of control signals P_CLK are shifted from each other, the level of simultaneity of photon counting may be an issue. In a fifth embodiment, an application using feedback control performed in subsequent processing, which is not illustrated, will be described. The phases of the plurality of control signals P_CLK are set through, for example, serial communication in subsequent processing, which is not illustrated.

As illustrated in FIGS. 12A and 12B, in a case where a subject is in motion, the level of simultaneity of photon counting may be an issue. In contrast, in a case where a subject is not in motion, the level of simultaneity of photon counting is not an issue.

Thus, the peak value of power consumption can be reduced by, for example, detecting a motion vector in an image in subsequent processing, which is not illustrated, and controlling the control signals P_CLK in accordance with detected motion information. That is, in a case where it is determined that there is a motion in the current frame, a higher priority is assigned to maintaining or improving image quality than to power reduction in the next frame, and timings at which the plurality of control signals P_CLK, which are pulse signals, transition between the levels are not made different from each other so as not to reduce the level of simultaneity of photon counting. As a result, subject distortion that may occur can be reduced. In contrast, in a case where it is determined that there is not a motion in the current frame, a higher priority is assigned to power reduction than to maintaining or improving image quality in the next frame, and timings at which the plurality of control signals P_CLK, which are pulse signals, transition between the levels are made different from each other. As a result, the peak value of power consumption can be reduced.

In a case where a digital camera is installed at a fixed position in the case of monitoring, goods inspection, or the like, it is supposed that a region where there is a motion and a region where there is not a motion are known in advance. Thus, feedforward control may be performed as to whether or not to shift the phases of the plurality of control signals P_CLK from each other.

With the fifth embodiment above, in a case where subject distortion may occur, this distortion can be reduced by controlling the phases of the plurality of control signals P_CLK in accordance with the motion of the subject.

Sixth Embodiment

Figure 14:
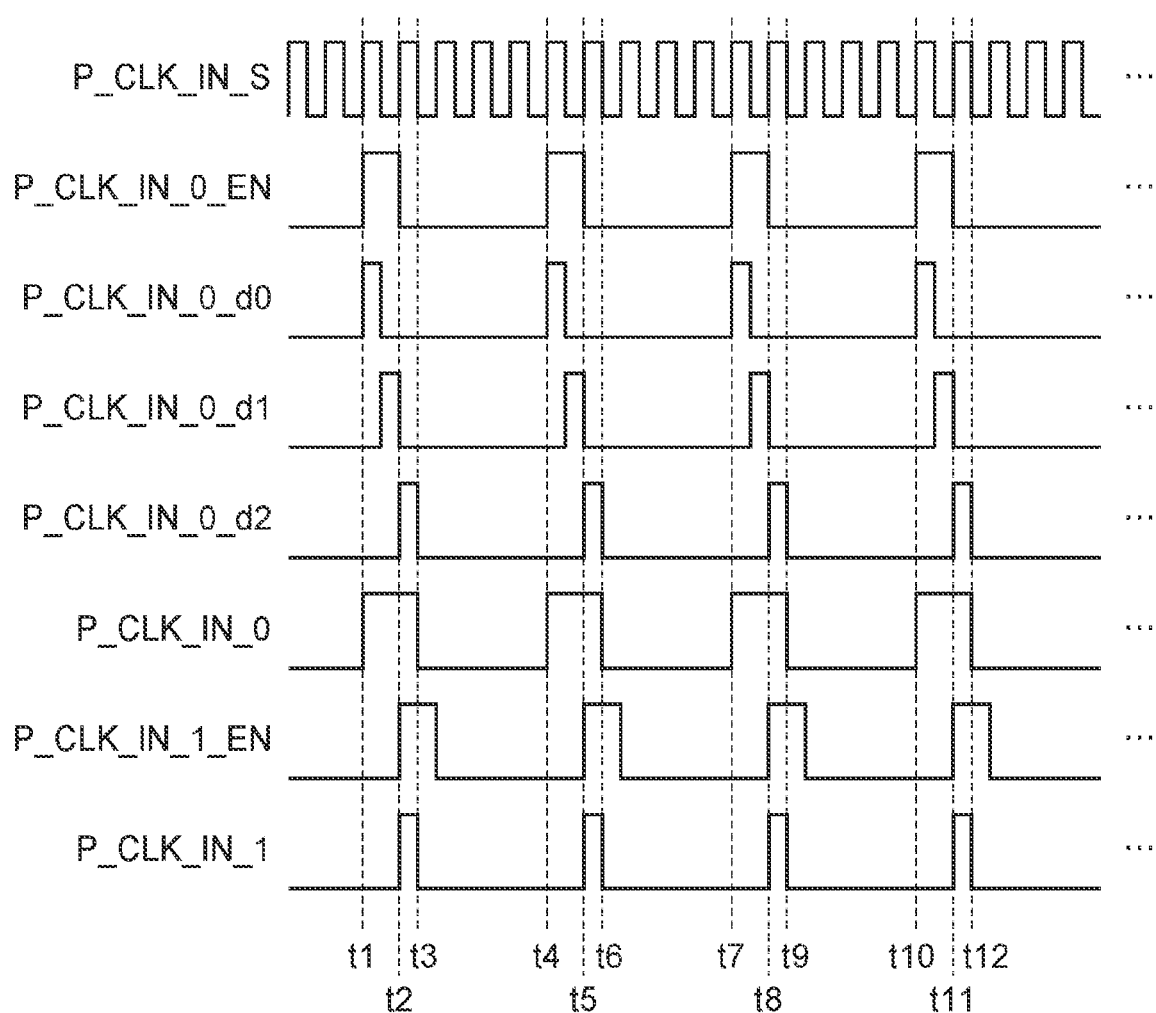
FIG. 14 is a timing chart diagram of the photoelectric conversion apparatus according to the third embodiment.

A sixth embodiment will be described using FIG. 14.

As illustrated in FIGS. 12A and 12B, when the phases of the plurality of control signals P_CLK are shifted from each other, the level of simultaneity of photon counting may be an issue. In a sixth embodiment, an application will be described in which the vertical scanning circuit 110 adjusts LOW periods of the plurality of control signals P_CLK, that is, HIGH periods of the input signals P_CLK_IN.

As illustrated in FIG. 5, a period in which a recharge current flows is determined by a LOW period of the control signal P_CLK, and photon counting is started from a rising edge of the control signal P_CLK. That is, by shifting falling edges of the plurality of control signals P_CLK from each other and matching rising edges thereof, the peak value of power consumption can be reduced without reducing the level of simultaneity of photon counting.

As illustrated in FIG. 3, the input signals P_CLK_IN generated by the control pulse generation unit or circuit 115 are input to the signal processing circuits 103 via the vertical scanning circuit 110. FIG. 14 is a timing chart diagram illustrating the way in which the vertical scanning circuit 110 adjusts the HIGH periods of the plurality of input signals P_CLK_IN.

An input signal P_CLK_IN_0_$d0$, which is generated by the control pulse generation unit or circuit 115 and whose HIGH periods have not yet been adjusted, is input to the vertical scanning circuit 110. The vertical scanning circuit 110 generates, using a delay element, P_CLK_IN_0_$d1$ and P_CLK_IN_0_$d2$, which are delayed signals of the input signal P_CLK_IN_0_$d0$. The vertical scanning circuit 110 generates an input signal P_CLK_IN_0 by taking the logical sum of P_CLK_IN_0_$d0$, P_CLK_IN_0_$d1$, and P_CLK_IN_0_$d2$. As a result, the input signal P_CLK_IN_0 rises at a time t1 and falls at a time t3. In contrast, an input signal P_CLK_IN_1 rises at a time t2 and falls at the time t3. That is, the rising edges of the plurality of input signals P_CLK_IN are shifted from each other, and the falling edges thereof match each other. As a result, the peak value of power consumption can be reduced without reducing the level of simultaneity of photon counting.

In this case, in order to simplify description, two kinds of delayed signal are generated, and the logical sum of three kinds of signal in total is taken; however, for example, three of more kinds of delayed signal are generated in accordance with a delay amount of the delay element, and the logical sum of these delayed signals may be taken.

In the above, the operation from the time t1 to the time t3 has been described. Thereafter, the operation from a time t4 to a time t12 is repetitions of the operation from the time t1 to the time t3, and thus description will be omitted.

In this manner, with the sixth embodiment, the peak value of power consumption can be reduced without reducing the level of simultaneity of photon counting by shifting the falling edges of P_CLK from each other and matching the rising edges thereof.

Seventh Embodiment

A photoelectric conversion system according to the present embodiment will be described using FIG. 15. FIG. 15 is a block diagram illustrating a schematic configuration of the photoelectric conversion system according to the present embodiment.

The photoelectric conversion apparatuses described in the first to sixth embodiments described above can be applied to various types of photoelectric conversion systems. Examples of the photoelectric conversion systems to which the photoelectric conversion apparatuses described in the first to sixth embodiments described above can be applied include digital still cameras, digital camcorders, surveillance cameras, copiers, fax machines, mobile phones, vehicle-mounted cameras, and observation satellites. The examples of the photoelectric conversion systems also include a camera module having an optical system such as a lens and an image pickup apparatus. FIG. 15 illustrates a block diagram of a digital camera as an example from among these examples.

The photoelectric conversion system illustrated in FIG. 15 includes an image pickup apparatus 1004 as an example of the photoelectric conversion apparatuses and a lens 1002 for causing the image pickup apparatus 1004 to form an optical image of a subject. The photoelectric conversion system further includes an iris 1003 for changing the amount of light passing through the lens 1002 and a barrier 1001 for protecting the lens 1002. The lens 1002 and the iris 1003 constitute an optical system for concentrating light onto the image pickup apparatus 1004. The image pickup apparatus 1004 is any one of the photoelectric conversion apparatuses according to the embodiments described above and converts the optical image formed by the lens 1002 into an electric signal.

The photoelectric conversion system includes a signal processing circuit 1007, which is an image generation unit configured to generate an image by performing processing on an output signal output from the image pickup apparatus 1004. The signal processing circuit 1007 performs an operation in which various types of correction or compression are performed as needed to output image data. The signal processing circuit 1007 may be formed on a semiconductor substrate provided with the image pickup apparatus 1004 or may be formed on another semiconductor substrate different from the semiconductor substrate provided with the image pickup apparatus 1004.

The photoelectric conversion system further includes a memory unit 1010 for temporarily storing image data and an external interface (I/F) unit 1013 for communicating with an external computer or the like. Furthermore, the photoelectric conversion system includes a recording medium 1012 such as a semiconductor memory for recording or reading out captured image data, and a recording medium control OF unit 1011 for recording data in or reading out data from the recording medium 1012. Note that the recording medium 1012 may be built in or detachable from the photoelectric conversion system.

Furthermore, the photoelectric conversion system includes an overall control/calculation unit 1009, which controls various types of arithmetic operations and the entire digital still camera, and a timing generation unit 1008, which outputs various types of timing signals to the image pickup apparatus 1004 and the signal processing circuit 1007. In this case, a timing signal and the like may be input from the outside. It is sufficient that the photoelectric conversion system include at least the image pickup apparatus 1004 and the signal processing circuit 1007, which processes an output signal output from the image pickup apparatus 1004.

The image pickup apparatus 1004 outputs an image pickup signal to the signal processing circuit 1007. The signal processing circuit 1007 performs certain signal processing on the image pickup signal output from the image pickup apparatus 1004 to output image data. The signal processing circuit 1007 generates an image using the image pickup signal output from the image pickup apparatus 1004.

In this manner, according to the present embodiment, the photoelectric conversion system can be realized to which any one of the photoelectric conversion apparatuses (image pickup apparatuses) according to the embodiments described above.

Eighth Embodiment

Figure 16A:
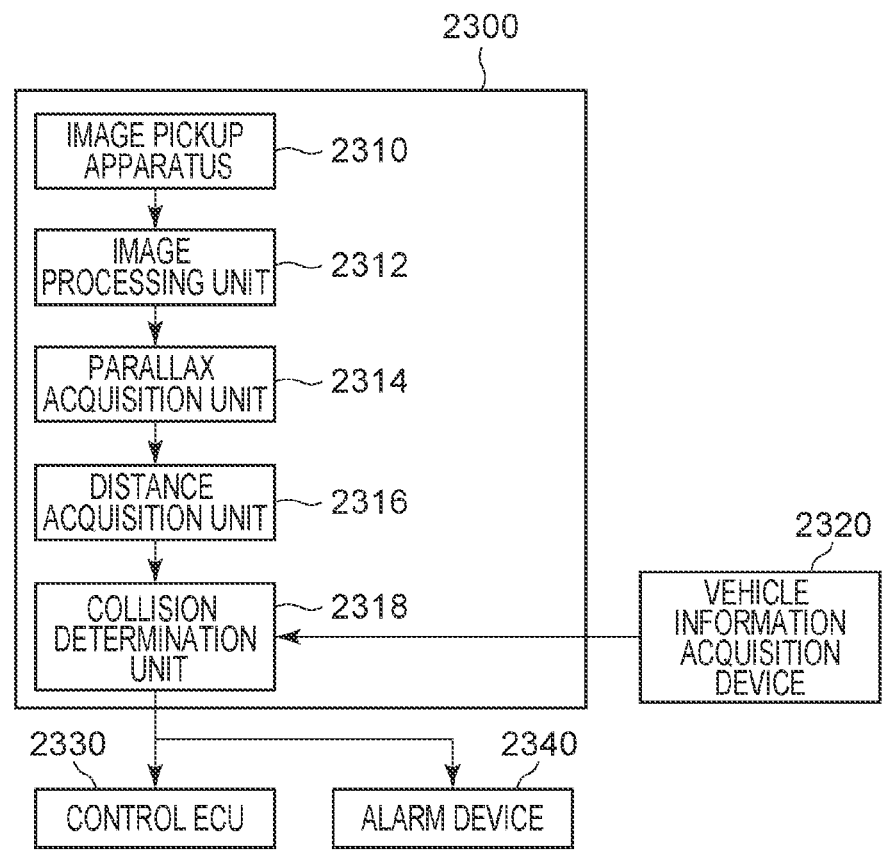
FIGS. 16A and 16B are functional block diagrams of a photoelectric conversion system according to a fifth embodiment.
Figure 16B:
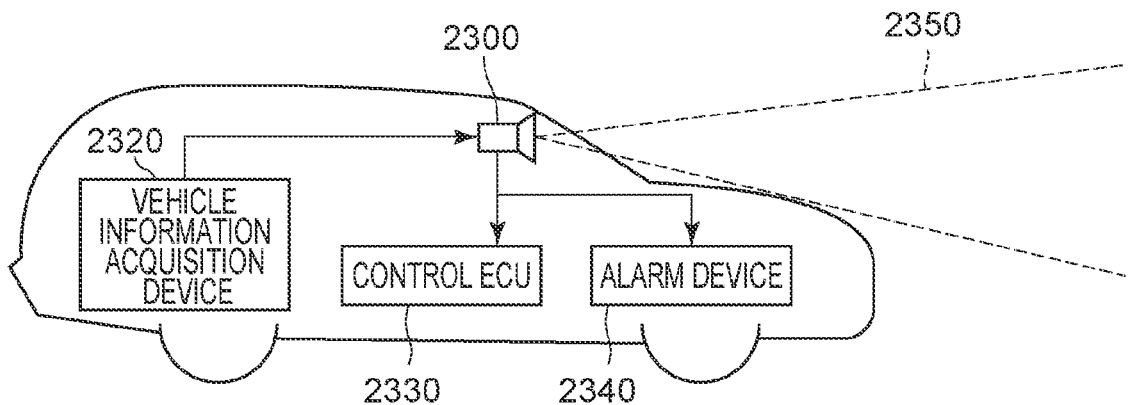

A photoelectric conversion system and a moving object according to the present embodiment will be described using FIGS. 16A and 16B. FIGS. 16A and 16B are diagrams illustrating the configurations of the photoelectric conversion system and the moving object according to the present embodiment.

FIG. 16A illustrates an example of the photoelectric conversion system regarding a vehicle-mounted camera. A photoelectric conversion system 2300 has an image pickup apparatus 2310. The image pickup apparatus 2310 is any one of the photoelectric conversion apparatuses described in the above-described embodiments. The photoelectric conversion system 2300 has an image processing unit 2312, which performs image processing on a plurality of pieces of image data acquired by the image pickup apparatus 2310. The photoelectric conversion system 2300 also has a parallax acquisition unit or circuit 2314, which calculates parallax (a phase difference of a parallax image) from a plurality of pieces of image data acquired by the image processing unit 2312. Furthermore, the photoelectric conversion system 2300 has a distance acquisition unit or circuit 2316 and a collision determination unit or circuit 2318. The distance acquisition unit or circuit 2316 calculates the distance to a target object on the basis of the calculated parallax. The collision determination unit or circuit 2318 determines, on the basis of the calculated distance, whether there are chances of a collision. In this case, the parallax acquisition unit or circuit 2314 or the distance acquisition unit or circuit 2316 is an example of a distance information acquisition unit configured to acquire information regarding the distance to the target object (hereinafter referred to as distance information). That is, the distance information is information regarding parallax, the amount of defocusing, the distance to the target object, and so forth. The collision determination unit or circuit 2318 may determine chances of a collision using any information included in the distance information. The distance information acquisition unit may be realized by a hardware device designed in a dedicated manner or a software module.

The distance information acquisition unit may also be realized by, for example, a field-programmable gate array (FPGA) or an application-specific integrated circuit (ASIC) or may also be realized by a combination of an FPGA and an ASIC.

The photoelectric conversion system 2300 is connected to a vehicle information acquisition device 2320 and can acquire vehicle information such as a vehicle speed, a yaw rate, and a steering angle. Moreover, a control engine control unit (ECU) 2330 is connected to the photoelectric conversion system 2300. The control ECU 2330 is a controller that outputs, on the basis of a determination result from the collision determination unit or circuit 2318, a control signal for causing the vehicle to generate a braking force. Moreover, the photoelectric conversion system 2300 is also connected to an alarm device 2340, which alerts the driver on the basis of a determination result from the collision determination unit or circuit 2318. For example, in a case where the chances of a collision are high based on a determination result from the collision determination unit or circuit 2318, the control ECU 2330 performs vehicle control to avoid a collision or reduce damage by braking, releasing the accelerator, controlling the engine output, or the like. The alarm device 2340 alerts the user by going off an alarm such as certain sound, displaying alarm information on the screen of, for example, a car navigation system, or vibrating their seat belt or the steering wheel.

In the present embodiment, images around the vehicle, for example, images of views in front of or behind the vehicle are captured by the photoelectric conversion system 2300. FIG. 16B illustrates the photoelectric conversion system for a case where images of views in front of the vehicle (an image pickup area 2350) are captured. The vehicle information acquisition device 2320 sends a command to the photoelectric conversion system 2300 or the image pickup apparatus 2310. With such a configuration, the accuracy of distance measurement can be more greatly improved.

In the above, an example has been described in which control for preventing the vehicle from colliding with other vehicles. However, the photoelectric conversion system 2300 can also be applied to perform, for example, control under which the vehicle drives autonomously so as to follow other vehicles or control under which the vehicle drives autonomously so as not to drive out of the lane. Furthermore, the photoelectric conversion system 2300 can be applied not only to vehicles such as the vehicle having the photoelectric conversion system 2300 but also to, for example, moving objects (moving apparatuses) such as vessels, airplanes, or industrial robots. In addition, the photoelectric conversion system 2300 can be applied not only to moving objects but also to a wide range of apparatuses using object recognition such as an intelligent transportation system (ITS).

Ninth Embodiment

Figure 17:
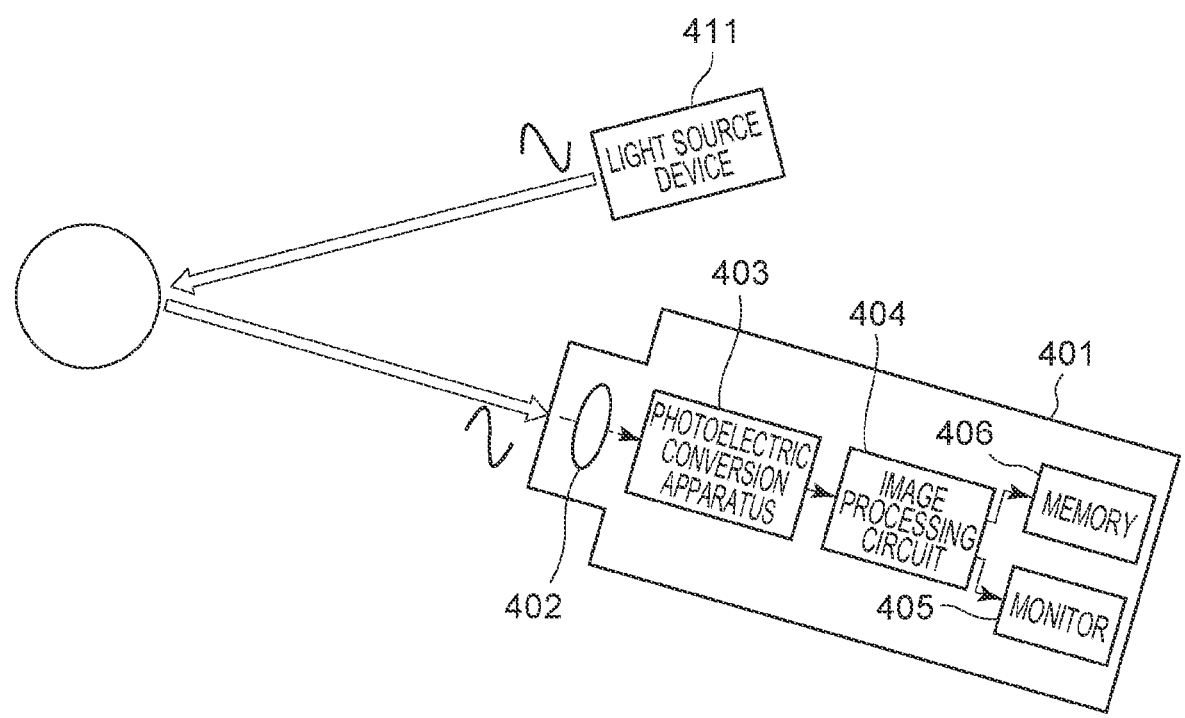
FIG. 17 is a functional block diagram of a photoelectric conversion system according to a sixth embodiment.

A photoelectric conversion system according to the present embodiment will be described using FIG. 17. FIG. 17 is a block diagram illustrating an example of the configuration of a distance image sensor, which is a photoelectric conversion system according to the present embodiment.

As illustrated in FIG. 17, a distance image sensor 401 includes an optical system 402, a photoelectric conversion apparatus 403, an image processing circuit 404, a monitor 405, and a memory 406. The distance image sensor 401 receives light emitted from a light source device 411 to a subject and reflected by the surface of the subject (modulated light or pulsed light) and consequently can acquire a distance image corresponding to the distance to the subject.

The optical system 402 includes one or more lenses. The optical system 402 guides image light (incident light) from the subject to the photoelectric conversion apparatus 403, and causes an image to be formed on a light receiving surface (a sensor unit) of the photoelectric conversion apparatus 403.

As the photoelectric conversion apparatus 403, any one of the photoelectric conversion apparatuses of the individual embodiments described above is used. A distance signal representing a distance obtained from a light reception signal and output from the photoelectric conversion apparatus 403 is supplied to the image processing circuit 404.

The image processing circuit 404 performs image processing in which a distance image is constructed on the basis of the distance signal supplied from the photoelectric conversion apparatus 403. The distance image (image data) obtained as a result of the image processing is supplied to and displayed on the monitor 405 or is supplied to and stored (recorded) in the memory 406.

In the distance image sensor 401 configured in this manner, by using one of the photoelectric conversion apparatuses described above, a more accurate distance image can be acquired, for example, as the characteristics of pixels are improved.

Tenth Embodiment

Figure 18:
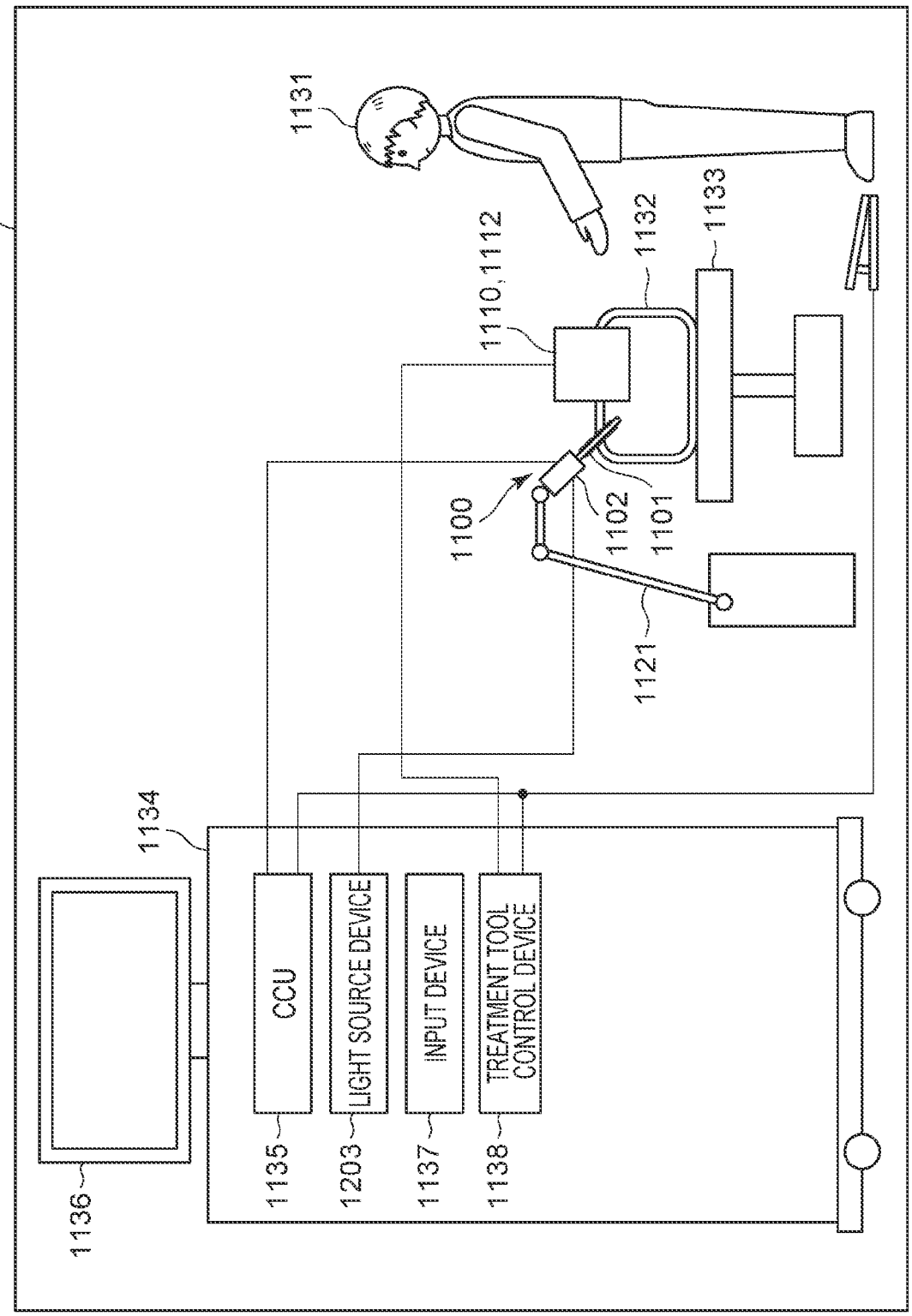
FIG. 18 is a functional block diagram of a photoelectric conversion system according to a seventh embodiment.

A photoelectric conversion system according to the present embodiment will be described using FIG. 18. FIG. 18 is a diagram illustrating an example of a schematic configuration of an endoscopic operation system, which is a photoelectric conversion system according to the present embodiment.

FIG. 18 illustrates a situation in which a practitioner (a doctor) 1131 is performing a surgical operation on a patient 1132 on a patient bed 1133 by using an endoscopic operation system 1003. As illustrated in FIG. 18, the endoscopic operation system 1003 includes an endoscope 1100, a surgical tool 1110, and a cart 1134, on which various types of devices for endoscopic operations are mounted.

The endoscope 1100 includes a lens tube 1101 and a camera head 1102. A portion of the lens tube 1101 starting from its leading edge and having a predetermined length is inserted into a body cavity of the patient 1132. The camera head 1102 is connected to a base end of the lens tube 1101. In the illustrated example, the endoscope 1100 is formed as a so-called rigid scope including the lens tube 1101, which is rigid; however, the endoscope 1100 may be formed as a so-called flexible scope having a flexible lens tube.

The leading edge of the lens tube 1101 is provided with an opening in which an objective lens is embedded. The endoscope 1100 is connected to a light source device 1203. Light generated by the light source device 1203 is guided to the leading edge of the lens tube 1101 along a light guide extended in the lens tube 1101, and is emitted toward an observation target in the body cavity of the patient 1132 through the objective lens. Note that the endoscope 1100 may be a direct-viewing endoscope, an oblique-viewing endoscope, or a side-viewing endoscope.

The camera head 1102 includes an optical system and a photoelectric conversion apparatus. Reflected light (observation light) from the observation target is concentrated by the optical system onto the photoelectric conversion apparatus. The observation light is photoelectrically converted by the photoelectric conversion apparatus, and an electric signal corresponding to the observation light, that is, an image signal corresponding to an observation image is generated. As the photoelectric conversion apparatus, any one of the photoelectric conversion apparatuses described in the individual embodiments described above can be used. The image signal is transmitted as RAW data to a camera control unit (CCU) 1135.

The CCU 1135 includes, for example, a central processing unit (CPU) and a graphics processing unit (GPU), and performs central control on operations of the endoscope 1100 and a display device 1136. Furthermore, the CCU 1135 receives an image signal from the camera head 1102, and performs, on the image signal, various types of image processing for displaying an image based on the image signal such as development processing (demosaicing) or the like.

The display device 1136 displays, under control performed by the CCU 1135, the image based on the image signal on which image processing is performed by the CCU 1135.

The light source device 1203 includes, for example, a light source such as a light-emitting diode (LED) and supplies, to the endoscope 1100, illumination light to be used when an image of a surgical site or the like is captured.

An input device 1137 is an input interface for the endoscopic operation system 1003. The user can input various types of information or commands to the endoscopic operation system 1003 through the input device 1137.

A treatment tool control device 1138 controls driving of an energy treatment tool 1112 for ablating or dissecting tissue, closing a blood vessel, or the like.

The light source device 1203 supplies, to the endoscope 1100, illumination light to be used when an image of a surgical site is captured. The light source device 1203 includes a white light source formed by, for example, LEDs, laser light sources, or a combination of LEDs and laser light sources. In a case where the white light source is formed by a combination of RGB laser light sources, the output intensity and the output timing of each color (each wavelength) can be controlled with high accuracy, and thus the white balance of a captured image can be adjusted by the light source device 1203. Moreover, in this case, by irradiating an observation target with laser light from each of the RGB laser light sources in a time division manner and controlling driving of an image sensor of the camera head 1102 in synchronization with the irradiation timing, images corresponding to R, G, and B in a respective manner can be captured in a time division manner. With the method, the image sensor can capture color images without being provided with color filters.

Driving of the light source device 1203 may be controlled such that the intensity of output light is changed every certain time period. Images are acquired in a time division manner by controlling driving of the image sensor of the camera head 1102 in synchronization with the timing at which the intensity of the light is changed, and the images are combined. As a result, high dynamic range images without so-called crushed shadows and blown highlights can be generated.

The light source device 1203 may also be configured to be capable of supplying light having a predetermined wavelength band corresponding to special light observation. In special light observation, for example, the wavelength dependence of light absorption in body tissue is used. Specifically, by performing irradiation with light of a narrower band than the illumination light used at the time of a normal observation (that is, white light), images of certain tissue such as a blood vessel in a mucosal surface layer can be captured with high contrast.

Alternatively, in special light observation, fluorescence observation may be performed in which an image is obtained using fluorescence generated by excitation light irradiation. In fluorescence observation, for example, body tissue is irradiated with excitation light, and fluorescence from the body tissue can be observed. Alternatively, in fluorescence observation, a reagent such as indocyanine green (ICG) is locally injected to body tissue, and the body tissue is irradiated with excitation light corresponding to the fluorescence wavelength of the reagent, so that a fluorescence image can be obtained. The light source device 1203 may be configured to be capable of supplying at least one out of light of a narrow band and excitation light that correspond to such special light observation.

Eleventh Embodiment

Figure 19A:
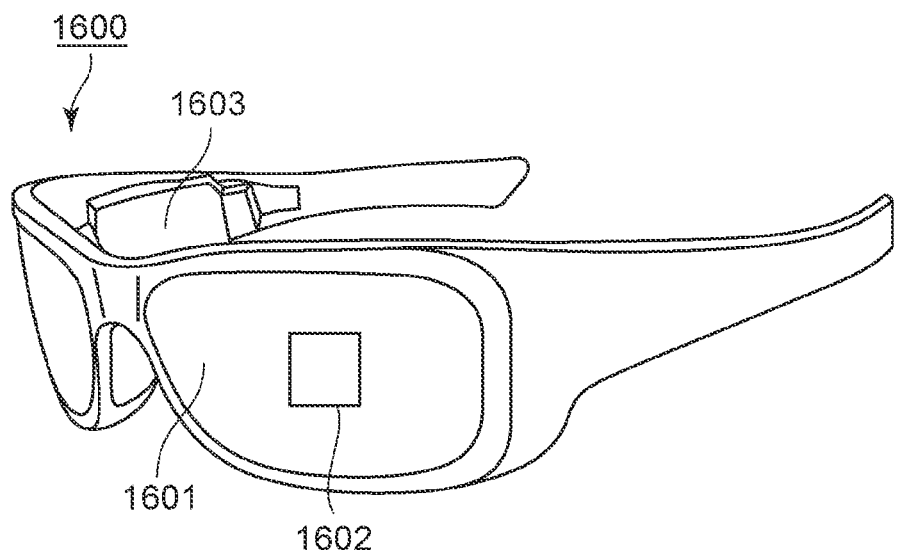
FIGS. 19A and 19B are schematic diagrams of a photoelectric conversion system according to an eighth embodiment.

A photoelectric conversion system according to the present embodiment will be described using FIGS. 19A and 19B. FIG. 19A illustrates glasses 1600 (smart glasses), which constitute a photoelectric conversion system of the present embodiment. The glasses 1600 have a photoelectric conversion apparatus 1602. The photoelectric conversion apparatus 1602 is one of the photoelectric conversion apparatuses described in the individual embodiments described above. A display device including a light-emitting device such as an organic light-emitting diode (OLED) or a light-emitting diode (LED) may be provided on the back side of a lens 1601. There may be one photoelectric conversion apparatus 1602 or more. Alternatively, a plurality of types of photoelectric conversion apparatuses may be combined and used. The photoelectric conversion apparatus 1602 does not have to be arranged at the position illustrated in FIG. 19A.

The glasses 1600 further have a control device 1603. The control device 1603 functions as a power source that supplies power to the photoelectric conversion apparatus 1602 and the display device described above. The control device 1603 controls the operation of the photoelectric conversion apparatus 1602 and the display device. In the lens 1601, an optical system is formed that concentrate light onto the photoelectric conversion apparatus 1602.

Figure 19B:
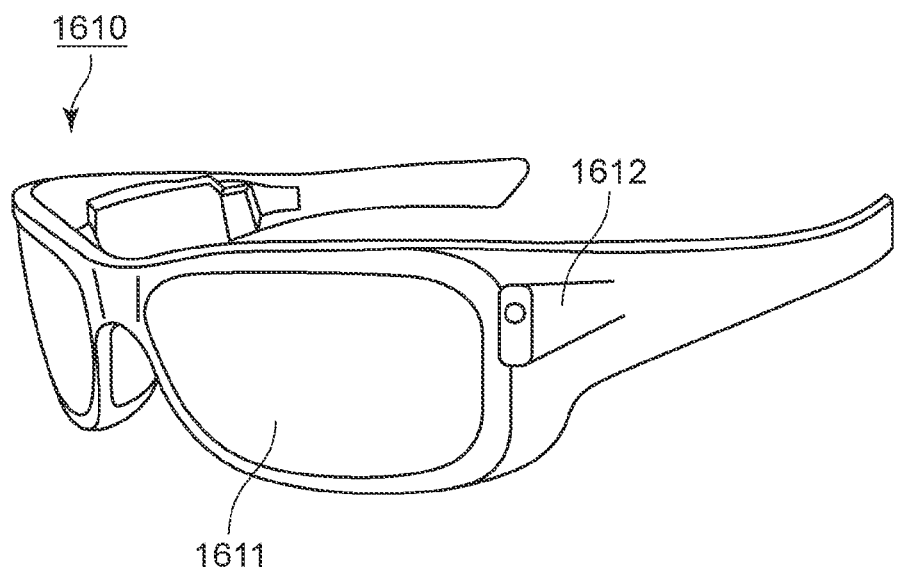

FIG. 19B illustrates glasses 1610 (smart glasses) according to one application. The glasses 1610 have a control device 1612. The control device 1612 includes a photoelectric conversion apparatus corresponding to the photoelectric conversion apparatus 1602 and a display device. In a lens 1611, an optical system is formed that projects light emitted from the photoelectric conversion apparatus and the display device included in the control device 1612. An image is projected onto the lens 1611. The control device 1612 functions as a power source that supplies power to the photoelectric conversion apparatus and the display device, and controls the operation of the photoelectric conversion apparatus and the display device. The control device 1612 may have a line-of-sight detection unit configured to detect the line of sight of the wearer. Infrared rays may be used to detect the line of sight of the wearer. An infrared-emitting unit emits infrared light to an eyeball of the user gazing at a displayed image. An image of their eyeball is captured by an image capturing unit, which has a light reception element, detecting reflected light of the emitted infrared light from their eyeball. A decrease in image quality is reduced by provision of a reduction unit that reduces the amount of light from the infrared-emitting unit to a display unit in a plan view.

The line of sight of the user to the displayed image is detected from the image of their eyeball captured through image capturing using infrared light. A freely chosen known method can be applied to line-of-sight detection using a captured image of their eyeball. As an example, a line-of-sight detection method based on Purkinje images generated by reflected illumination light from the user's cornea can be used.

More specifically, line-of-sight detection processing based on a pupil-corneal reflection method is performed. The line of sight of the user is detected by calculating, using a pupil-corneal reflection method, a line-of-sight vector representing the orientation of their eyeball (a rotation angle) on the basis of an image of their pupil and Purkinje images included in a captured image of their eyeball.

The display device according to the present embodiment has a photoelectric conversion apparatus having a light reception element, and may control an image displayed on the display device on the basis of information regarding the user's line of sight from the photoelectric conversion apparatus.

Specifically, for the display device, a first line-of-sight region, at which the user gazes, and a second line-of-sight region other than the first line-of-sight region are determined on the basis of the line-of-sight information. The first line-of-sight region and the second line-of-sight region may be determined by the control device of the display device. Alternatively, the first line-of-sight region and the second line-of-sight region determined by an external control device may be received. In a display region of the display device, the display resolution of the first line-of-sight region may be controlled to be higher than that of the second line-of-sight region. That is, the resolution of the second line-of-sight region may be made lower than that of the first line-of-sight region.

The display region has a first display region and a second display region, which is different from the first display region. A prioritized region may be determined from among the first display region and the second display region on the basis of the line-of-sight information. The first display region and the second display region may be determined by the control device of the display device. Alternatively, the first display region and the second display region determined by an external control device may be received. The resolution of the prioritized region may be controlled to be higher than that of the region other than the prioritized region. That is, the resolution of the region having a relatively low priority may be reduced.

Note that artificial intelligence (AI) may be used to determine the first line-of-sight region or the prioritized region. AI may be a model configured to use an image of a user's eyeball and the direction in which their eyeball in the image actually sees as supervised data and to estimate the angle of the line of sight from an image of a user's eyeball and the distance to a target ahead of the line of sight. The display device, the photoelectric conversion apparatus, or an external device may have an AI program. In a case where an external device has the AI program, the angle of the line of sight of the user and the distance to the target are transferred to the display device through communication.

In a case where display control is performed on the basis of visual recognition and detection, the present embodiment can be applied to smart glasses further having a photoelectric conversion apparatus that captures an outside image. The smart glasses can display, in real time, outside information regarding a captured outside image.

Modified Embodiments

The disclosure is not limited to the above-described embodiments, and various modifications are possible.

For example, an example obtained by adding part of any one of the embodiments to another one of the embodiments and an example obtained by replacing part of one of the embodiments with part of another one of the embodiments are also included in embodiments of the disclosure.

Moreover, the photoelectric conversion systems according to the seventh and eighth embodiments are examples of photoelectric conversion systems to which the photoelectric conversion apparatuses can be applied. The photoelectric conversion systems to which the photoelectric conversion apparatuses according to the disclosure are applicable are not limited to the configurations illustrated in FIGS. 15 to 16B. This may also apply to the ToF system illustrated in the ninth embodiment, the endoscope illustrated in the tenth embodiment, and the smart glasses illustrated in the eleventh embodiment.

Note that all the above-described embodiments are mere concrete examples for implementing the disclosure, and thus the technical scope of the disclosure should not be construed as a technical scope limited by these embodiments. That is, the disclosure can be implemented in various forms without departing from its technical concept or its major characteristics.

According to the disclosure, a power photoelectric conversion apparatus can be provided that flattens power consumption and reduces peak power.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-069480 filed Apr. 20, 2022, which is hereby incorporated by reference herein in its entirety.

What is claimed is:

1. A photoelectric conversion apparatus comprising:
a first pixel, which includes a photodiode configured to perform avalanche multiplication, and a signal processing circuit configured to generate a signal based on a photon detected by the photodiode; and
a second pixel, which includes a photodiode configured to perform avalanche multiplication, and a signal processing circuit configured to generate a signal based on a photon detected by the photodiode, wherein
each signal processing circuit includes a control circuit, and a counter, wherein
the control circuit is connected to the photodiode and a generation circuit configured to generate a pulse signal, and performs control, based on the pulse signal, so as to be in a standby state in which one node of the photodiode is floating or a recharge state in which a potential at the node is returned to a certain potential,
the counter counts the number of periods in which avalanche multiplication has occurred among a plurality of periods in the standby state, and
a third pulse of the pulse signal for the second pixel is input to the control circuit of the second pixel in a period from when a first pulse of the pulse signal for the first pixel is input to the control circuit of the first pixel to when a second pulse of the pulse signal for the first pixel subsequent to the first pulse is input to the control circuit of the first pixel.

2. The photoelectric conversion apparatus according to claim 1, wherein
the pulse signal supplied to the control circuit of the first pixel has a fourth pulse subsequent to the second pulse,
the pulse signal supplied to the control circuit of the second pixel has a fifth pulse subsequent to the third pulse, and
the fifth pulse is input to the control circuit of the second pixel in a period from when the second pulse is input to the control circuit of the first pixel to when the fourth pulse is input to the control circuit of the first pixel.

3. The photoelectric conversion apparatus according to claim 1, wherein
a timing at which the pulse signal transitions from a first level to a second level in the first pixel, the pulse signal causing the control circuit of the first pixel to transition to the recharge state, differs from a timing at which the pulse signal transitions from the first level to the second level in the second pixel, the pulse signal causing the control circuit of the second pixel to transition to the recharge state, and
a timing at which the pulse signal transitions from the second level to the first level in the first pixel, the pulse signal causing the control circuit of the first pixel to transition to the recharge state, matches a timing at which the pulse signal transitions from the second level to the first level in the second pixel, the pulse signal causing the control circuit of the second pixel to transition to the recharge state.

4. The photoelectric conversion apparatus according to claim 1,
the photoelectric conversion apparatus having a plurality of pixels including the first pixel and the second pixel and arranged in an array, wherein
the first pixel is arranged in a first pixel row, and the second pixel is arranged in a second pixel row, which is different from the first pixel row.

5. The photoelectric conversion apparatus according to claim 4,
wherein the control circuits treat rows of the plurality of pixels as units of control, and a plurality of pixels arranged in each unit of control among the plurality of pixels share a first control signal line.

6. The photoelectric conversion apparatus according to claim 1, wherein
the control circuit treats, as units of control, pixel regions each including a plurality of pixels including the first pixel or the second pixel,
the pixel regions include a first pixel region including the first pixel, and
has a third pixel, which is different from the first pixel arranged in the first pixel region,
the plurality of pixels arranged in each unit of control share a first control signal line, and
the first pixel and the third pixel are controlled by a common signal supplied through the first control signal line.

7. The photoelectric conversion apparatus according to claim 5,
wherein timings at which the pulse signals transition between levels match each other, the pulse signals causing the control circuits of the pixels arranged in the unit of control to transition to the recharge state.

8. The photoelectric conversion apparatus according to claim 5, wherein
a plurality of pixels arranged in each unit of control among the plurality of pixels share a second control signal line, and
a timing at which the pulse signals transition between levels, the pulse signals causing the control circuits of the pixels arranged in the unit of control and receiving a signal supplied from the first control signal line to transition to the recharge state, differs from a timing at which the pulse signals transition between the levels, the pulse signals causing the control circuits of the pixels arranged in the unit of control and receiving a signal supplied from the second control signal line to transition to the recharge state.

9. The photoelectric conversion apparatus according to claim 5, wherein
the units of control in the first frame differ from
the units of control in a second frame subsequent to the first frame.

10. The photoelectric conversion apparatus according to claim 5, wherein
a timing difference between the units of control in a first frame differs from that in a second frame subsequent to the first frame, the timing difference being a difference between timings at which the pulse signals for the units of control transition between levels, the pulse signals causing the control circuits to transition to the recharge state.

11. The photoelectric conversion apparatus according to claim 1,
the photoelectric conversion apparatus being capable of performing a global shutter operation, wherein
a timing at which a sixth pulse transitions between levels and a timing at which a seventh pulse transitions between the levels are made to match each other, the sixth pulse being an initial pulse of the pulse signal that causes the control circuit of the first pixel to transition to the recharge state after scanning for the global shutter operation is started,
the seventh pulse being an initial pulse of the pulse signal that causes the control circuit of the second pixel to transition to the recharge state after scanning for the global shutter operation is started.

12. The photoelectric conversion apparatus according to claim 1,
the photoelectric conversion apparatus being capable of performing a global shutter operation, wherein
a timing at which the first pulse transitions between levels is made different from a timing at which the third pulse transitions between the levels, the first pulse being an initial pulse of the pulse signal that causes the control circuit of the first pixel to transition to the recharge state after scanning for the global shutter operation is started,
the third pulse being an initial pulse of the pulse signal that causes the control circuit of the second pixel to transition to the recharge state after scanning for the global shutter operation is started.

13. The photoelectric conversion apparatus according to claim 1, wherein
in a case where a determination of high illuminance is made in a first frame,
a timing at which the pulse signal for the first pixel transitions between levels and a timing at which the pulse signal for the second pixel transitions between the levels are made different from each other in a second frame subsequent to the first frame.

14. The photoelectric conversion apparatus according to claim 5, wherein
in a unit of control that is determined to have high illuminance in a first frame,
a timing at which the pulse signal for the first pixel transitions between levels and a timing at which the pulse signal for the second pixel transitions between the levels are made different from each other in a second frame subsequent to the first frame.

15. The photoelectric conversion apparatus according to claim 5, wherein
in a unit of control where it is determined that a subject is in motion in a first frame,
a timing at which the pulse signal for the first pixel transitions between levels and a timing at which the pulse signal for the second pixel transitions between the levels are made to match each other in a second frame subsequent to the first frame.

16. The photoelectric conversion apparatus according to claim 5, wherein
in a unit of control where it is known that a subject is in motion,
a timing at which the pulse signal for the first pixel transitions between levels and a timing at which the pulse signal for the second pixel transitions between the levels are made to match each other in a second frame subsequent to the first frame.

17. The photoelectric conversion apparatus according to claim 1,
wherein the generation circuit is capable of setting, based on an image capturing condition, whether or not to make a timing at which the pulse signal for the first pixel transitions between levels and a timing at which the pulse signal for the second pixel transitions between the levels different from each other.

18. A photoelectric conversion system including the photoelectric conversion apparatus according to claim 1, the photoelectric conversion system comprising:

a light emission circuit configured to emit light, which is to be detected by the photoelectric conversion apparatus; and a calculation circuit configured to calculate a distance using a digital signal held by the photoelectric conversion apparatus.

19. A moving object comprising:

the photoelectric conversion apparatus according to claim 1;

an acquisition circuit configured to acquire, from a parallax image based on a signal from the photoelectric conversion apparatus, distance information regarding a distance to a target object; and a controller configured to control, based on the distance information, the moving object.

* * * * *